(12) United States Patent
Jeon et al.

(10) Patent No.: US 10,313,669 B2
(45) Date of Patent: Jun. 4, 2019

(54) VIDEO DATA ENCODING AND VIDEO ENCODER CONFIGURED TO PERFORM THE SAME

(71) Applicant: Samsung Electronics Co., Ltd., Suwon-si, Gyeonggi-do (KR)

(72) Inventors: Min-Su Jeon, Seoul (KR); Sung-Ho Roh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 84 days.

(21) Appl. No.: 15/691,054

(22) Filed: Aug. 30, 2017

(65) Prior Publication Data
US 2018/0184084 A1    Jun. 28, 2018

(30) Foreign Application Priority Data
Dec. 28, 2016  (KR) .................. 10-2016-0180916

(51) Int. Cl.
| | |
|---|---|
| *H04N 19/103* | (2014.01) |
| *H04N 19/105* | (2014.01) |
| *H04N 19/114* | (2014.01) |
| *H04N 19/12* | (2014.01) |
| *H04N 19/177* | (2014.01) |
| *H04N 19/152* | (2014.01) |

(Continued)

(52) U.S. Cl.
CPC ......... *H04N 19/114* (2014.11); *H04N 19/103* (2014.11); *H04N 19/105* (2014.11); *H04N 19/12* (2014.11); *H04N 19/142* (2014.11); *H04N 19/147* (2014.11); *H04N 19/152* (2014.11); *H04N 19/154* (2014.11); *H04N 19/177* (2014.11)

(58) Field of Classification Search
CPC combination set(s) only.
See application file for complete search history.

(56) References Cited

U.S. PATENT DOCUMENTS

| | | | |
|---|---|---|---|
| 6,804,301 | B2 | 10/2004 | Wu et al. |
| 8,396,125 | B2 | 3/2013 | Arimura et al. |

(Continued)

FOREIGN PATENT DOCUMENTS

| | | |
|---|---|---|
| JP | 2002/199398 A | 7/2002 |
| JP | 2002-199398 A | 7/2002 |

(Continued)

*Primary Examiner* — Behrooz M Senfi
(74) *Attorney, Agent, or Firm* — Harness, Dickey & Pierce, P.L.C.

(57) ABSTRACT

A device that may implement a video encoder may include generating a video display that includes groups of encoded pictures selected based on comparisons between different groups of encoded pictures that are generated according to separate, independent encoding schemes. Input pictures may include multiple subgroups of one or more input pictures. Each subgroup of pictures may be encoded multiple times, according to separate, independent encoding schemes to generate multiple candidate encoded groups associated with each subgroup. For each subgroup, one candidate encoded group may be selected as encoded pictures associated with the subgroup. The selected encoded pictures may be used to generate a video display that includes the encoded pictures associated with the plurality of subgroups.

20 Claims, 19 Drawing Sheets

(51) Int. Cl.
*H04N 19/142* (2014.01)
*H04N 19/154* (2014.01)
*H04N 19/147* (2014.01)

(56) References Cited

U.S. PATENT DOCUMENTS

| | | | |
|---|---|---|---|
| 8,948,260 B2 | 2/2015 | Tian et al. | |
| 9,307,235 B2 | 4/2016 | Zhao et al. | |
| 2009/0122660 A1 | 5/2009 | Yin et al. | |
| 2009/0122860 A1* | 5/2009 | Yin | H04N 19/61 375/240.02 |
| 2010/0254455 A1* | 10/2010 | Matsunaga | G11B 27/10 375/240.12 |
| 2016/0198166 A1* | 7/2016 | Kudana | H04N 19/194 375/240.15 |
| 2017/0302930 A1* | 10/2017 | Mora | H04N 19/139 |

FOREIGN PATENT DOCUMENTS

| | | |
|---|---|---|
| JP | 2003/250152 A | 9/2003 |
| JP | 2003-250152 A | 9/2003 |
| JP | 2009/296328 A | 12/2009 |
| JP | 2009-296328 A | 12/2009 |
| KR | 100915055 B1 | 9/2009 |

\* cited by examiner

VIDEO DATA ENCODING AND VIDEO ENCODER CONFIGURED TO PERFORM THE SAME

CROSS-REFERENCE TO RELATED APPLICATIONS

This application claims priority under 35 USC § 119 to Korean Patent Application No. 10-2016-0180916, filed on Dec. 28, 2016 in the Korean Intellectual Property Office (KIPO), the contents of which are herein incorporated by reference in their entirety.

BACKGROUND

1. Technical Field

Example embodiments relate generally to video processing, and more particularly to methods of encoding video data for adaptively adjusting a structure of a group of pictures (GOP), video encoders performing the methods, and electronic systems including the video encoders.

2. Description of the Related Art

MPEG (Moving Picture Expert Group) under ISO/IEC (International Organization for Standardization/International Electrotechnical Commission) and VCEG (Video Coding Expert Group) under ITU-T (International Telecommunications Union Telecommunication) are leading standards of video encoding/decoding. For example, various international standards of video encoding/decoding, such as MPEG-1, MPEG-2, H.261, H.262 (or MPEG-2 Part 2), H.263, MPEG-4, AVC (Advanced Video Coding), HEVC (High Efficiency Video Coding), etc., have been established and used. AVC is also known as H.264 or MPEG-4 part 10, and HEVC is also known as H.265 or MPEG-H Part 2. According to increasing demands for high resolution and high quality videos, such as high definition (HD) videos, ultra HD (UHD) videos, etc., research has focused on video encoding for achieving improved compression performance.

SUMMARY

Accordingly, the present disclosure is provided to substantially obviate one or more problems due to limitations and disadvantages of the related art.

At least one example embodiment of the present disclosure provides a method of encoding video data capable of adaptively adjusting a structure of a group of pictures (GOP) based on characteristics of input pictures.

At least one example embodiment of the present disclosure provides a video encoder that performs the method of encoding the video data.

At least one example embodiment of the present disclosure provides an electronic system that includes the video encoder.

According to some example embodiments, a method of encoding video data may include receiving a plurality of input pictures, the plurality of input pictures including a plurality of subgroups of one or more input pictures, a size of each subgroup being smaller than a size of a group of pictures (GOP). The method may include generating, for each given subgroup, a plurality of candidate encoded groups associated with the given subgroup based on encoding one or more input pictures included in the given subgroup multiple times according to separate, independent encoding schemes. The method may include selecting, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other. The method may include generating a video display based on the selecting, the video display including the pluralities of encoded pictures associated with the plurality of subgroups, respectively.

According to some example embodiments, a video encoder may include a memory storing a program of instructions, and a processor. The processor may be configured to execute the program of instructions to receive a plurality of input pictures, output the plurality of input pictures as a plurality of subgroups of one or more input pictures, a size of each subgroup being smaller than a size of a group of pictures (GOP), generate, for each given subgroup, a plurality of candidate encoded groups associated with the given subgroup based on encoding one or more input pictures included in the given subgroup multiple times according to separate, independent encoding schemes, store, for each given subgroup, the plurality of candidate encoded groups associated with the given subgroup in a buffer pool, select, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other, and generate a video display based on the selecting, the video display including the pluralities of encoded pictures associated with the plurality of subgroups, respectively.

According to some example embodiments, an electronic system may include a memory storing a program of instructions, and a processor. The processor may be configured to execute the program of instructions to provide a plurality of input pictures, and encode the plurality of input pictures. The encoding may include receiving the plurality of input pictures, outputting the plurality of input pictures as a plurality of subgroups of one or more input pictures, a size of each subgroup being smaller than a size of a group of pictures (GOP), generating, for each given subgroup, a plurality of candidate encoded groups associated with the given subgroup based on encoding one or more input pictures included in the given subgroup multiple times according to separate, independent encoding schemes, storing the plurality of candidate encoded groups in a plurality of buffers, selecting, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other, and generating a video display based on the selecting, the video display including the pluralities of encoded pictures associated with the plurality of subgroups, respectively.

According to some example embodiments, an electronic device may include a memory storing a program of instructions and a processor. The processor may be configured to execute the program of instructions to receive a plurality of input pictures, the plurality of input pictures including a plurality of subgroups of one or more input pictures, a size of each subgroup being smaller than a size of a group of pictures (GOP), generate, for each given subgroup, a plurality of candidate encoded groups associated with the given subgroup based on encoding one or more input pictures included in the given subgroup multiple times according to separate, independent encoding schemes, select, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other, and generate a video display based on the selecting, the video display including the pluralities of encoded pictures associated with the plurality of subgroups, respectively.

In the method of encoding video data and the video encoder according to some example embodiments, one (e.g., optimized one, best one, most appropriate one, . . . ) of the plurality of candidate encoded groups that are generated by encoding each subgroup multiple times may be selected. In other words, a structure of the GOP may not be fixed, but may be variable. An optimized encoded picture and an optimized picture type for a current picture may be adaptively selected, and thus coding efficiency and performance may be improved. In addition, the method of encoding the video data according to some example embodiments may be efficiently adopted to an example where a characteristic of pictures is sharply or drastically changed (e.g., in a case of a scene change).

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
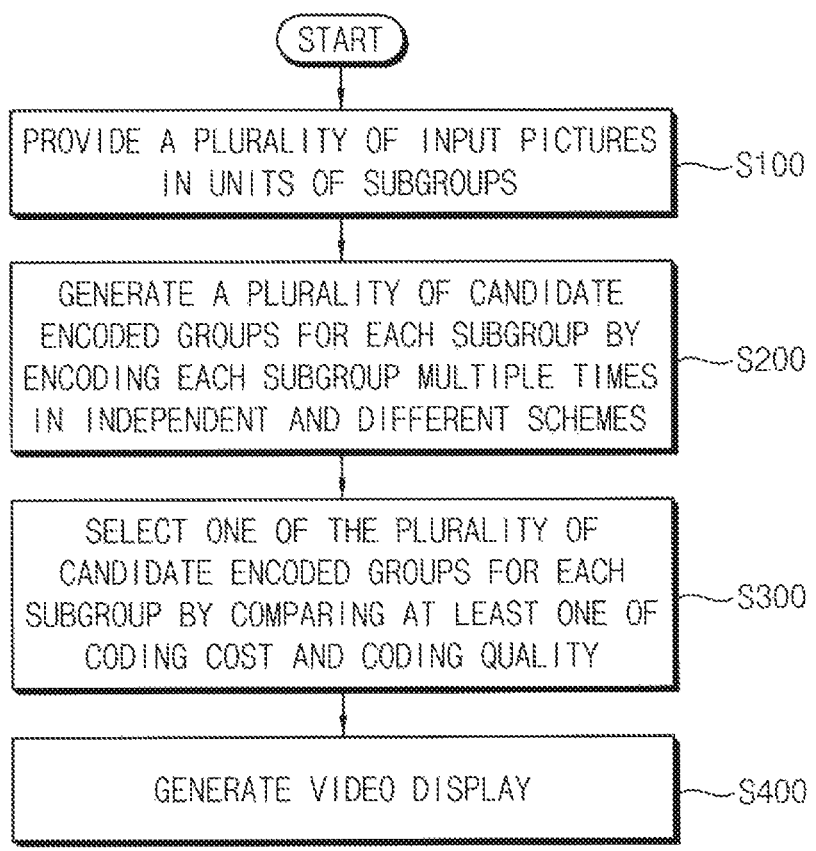
FIG. 1 is a flow chart illustrating a method of encoding video data according to some example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flow chart illustrating a method of encoding video data according to some example embodiments. The method illustrated in FIG. 1 may be implemented, in whole or in part, by one or more video encoders, electronic systems, and/or electronic devices as described herein, including the electronic system and/or electronic device illustrated and described with reference to FIG. 18.

In some example embodiments, including the example embodiments shown in FIG. 1, video data includes a plurality of pictures, and the plurality of pictures are encoded based on a group of pictures (GOP) and a subgroup. As will be described with reference to FIG. 3, the GOP is determined by assigning separate sets of pictures of the plurality of pictures as one or more intra pictures and one or more inter pictures, respectively, where each intra picture is encoded without reference to any other ("separate") pictures of the plurality of input pictures (e.g., coded independently of other input pictures) and each inter picture is encoded with reference to one or more other ("separate") pictures of the plurality of input pictures (e.g., coded dependently of one or more other input pictures).

Referring to FIG. 1, in a method of encoding video data according to some example embodiments, a plurality of input pictures at least partially comprising an instance of video data are provided and/or received in units of a plurality of subgroups (e.g., the plurality of input pictures includes a plurality of subgroups, and each subgroup includes one or more input pictures) (step S100). A size of each subgroup (e.g., quantity of input pictures in each subgroup) is smaller than a size of (e.g., quantity of input pictures in) a GOP. The size of the GOP may represent the number ("quantity") of pictures included in a single GOP, and the size of each subgroup may represent the number of pictures included in a single subgroup. For example, a single subgroup may include more than two pictures. Configurations of the GOP and the subgroup will be described with reference to FIGS. 3 and 7.

The video data may be encoded by units of pictures depending on standards such as MPEG-2, H.261, H.262, H.263, MPEG-4, H.264, HEVC, etc. For example, each picture may correspond to a frame in progressive scan form or a field in an interlaced scan form.

A plurality of candidate encoded groups for each subgroup are generated based on encoding one or more input pictures included in each subgroup multiple times in independent and different schemes (e.g., separate, independent encoding schemes) (step S200). Restated, for each given subgroup, a plurality of candidate encoded groups associated with the given subgroup may be generated based on encoding one or more input pictures included in the given subgroup multiple times according to separate, independent encoding schemes. For example, a single subgroup may be encoded more than two times in independent and different schemes ("encoding schemes"), and then more than two candidate encoded groups for (candidate encoded groups associated with) the single subgroup may be generated. A plurality of (e.g., more than two) encoding operations may be sequentially performed in units of subgroups. In a plurality of (e.g., more than two) candidate encoded groups for ("associated with") the single subgroup, a picture type and a picture order (e.g., an arranging order) of candidate encoded pictures included in one candidate encoded group may be different from those of candidate encoded pictures included in another candidate encoded group.

For each given subgroup, one candidate encoded group of the plurality of candidate encoded groups associated with the given subgroup may be selected as a set of one or more encoded pictures associated with the input pictures included in the given subgroup based on comparing at least one coding parameter, of coding cost and coding quality, of the plurality of candidate encoded groups associated with the given subgroup with each other (step S300). Accordingly, a plurality of encoded pictures corresponding to the plurality of input pictures may be sequentially selected and output in units of subgroups (e.g., separate pluralities of encoded pictures may be selected for separate, respective subgroups). Restated, for each given subgroup, one candidate encoding group, of the plurality of candidate encoded groups associated with the given subgroup, may be selected as a plurality of encoded pictures associated with the given subgroup based on comparing at least one coding parameter, of coding cost and coding quality, of the plurality of candidate encoded groups associated with the given subgroup with each other.

The above-described generating and selecting (S200 and S300) may be performed to generate encoded video data that includes, the selected pluralities of encoded pictures associated with the plurality of subgroups, respectively. In some example embodiments, a video display is generated based on at least the selecting, such that the video display (also referred to herein as simply a "video") includes the pluralities of encoded pictures associated with the plurality of subgroups, respectively (S400). The video display may be a sequence of encoded pictures, including the pluralities of encoded pictures associated with the plurality of subgroups, respectively. Generating the video display may include displaying the sequence of encoded pictures in a display interface ("input/output (I/O) device") and/or transmitting the sequence of encoded pictures to a remote device (e.g., via a video stream) such that the sequence of encoded pictures are displayed in a display interface of the remote device.

In the method of encoding the video data according to some example embodiments, one (e.g., optimized one, best one, most appropriate one, . . . ) of the plurality of candidate encoded groups that are generated by encoding each subgroup multiple times may be selected. In other words, in the method of encoding the video data according to some example embodiments, a structure of the GOP may not be fixed, but may be variable. An optimized encoded picture and an optimized picture type for a current picture may be adaptively selected, and thus coding efficiency and performance may be improved. As a result, operating performance of a video encoder, electronic system, and/or electronic device configured to perform at least the encoding of video data may be improved. In addition, the method of encoding the video data according to some example embodiments may be efficiently adopted to an example where a characteristic of pictures is sharply or drastically changed (e.g., in a case of a scene change). As a result, a video encoder, electronic system, and/or electronic device configured to perform at least the encoding of video data may be configured to improve video encoding performance and efficiency in such cases. Thus, the generation of video displays based on encoding of video data may be improved.

Figure 2:
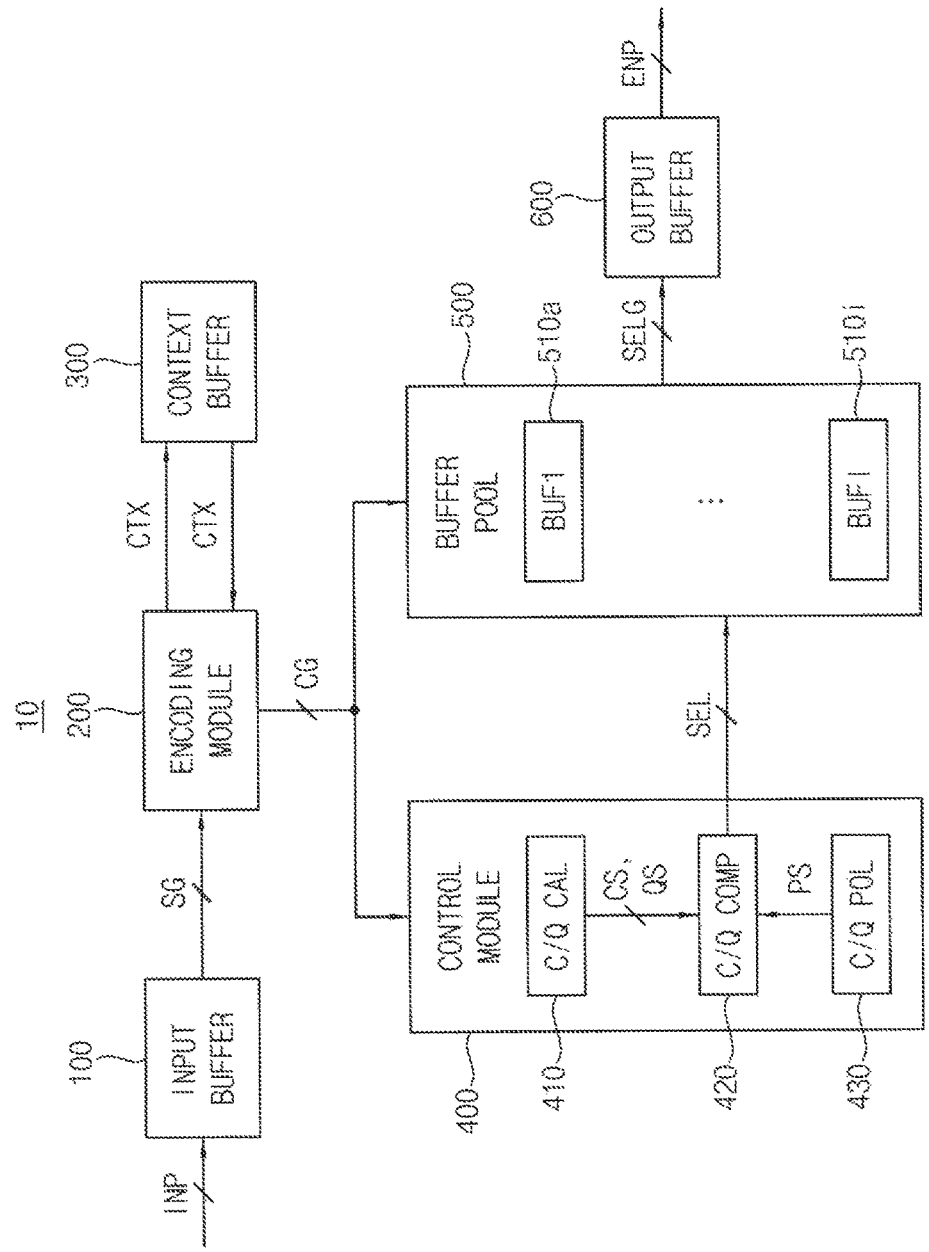
FIG. 2 is a block diagram illustrating a video encoder according to some example embodiments.

FIG. 2 is a block diagram illustrating a video encoder according to some example embodiments. The video encoder illustrated in FIG. 2 may be implemented, in whole or in part, by one or more electronic systems and/or electronic devices as described herein, including the electronic system and/or electronic device illustrated and described with reference to FIG. 18. For example, the video encoder shown in FIG. 2 may be implemented, in whole or in part, by the processor 1030 of the electronic system 1000 of FIG. 18 executing a program of instructions stored on a storage device 1050 (e.g., a memory) of the electronic system 1000.

Referring to FIG. 2, a video encoder 10 includes an input buffer 100, an encoding module 200, a control module 400 and a buffer pool 500. The video encoder 10 may further include a context buffer 300 and an output buffer 600.

The input buffer 100 receives a plurality of input pictures INP, and outputs the plurality of input pictures INP in units of subgroups. A size of each subgroup is smaller than a size of a GOP. For example, a single GOP may include N input pictures among the plurality of input pictures INP, where N is a natural number. Each of a plurality of subgroups SG may include M input pictures, where M is a natural number equal to or greater than two and less than N.

The encoding module 200 generates a plurality of candidate encoded groups CG for each of the plurality of subgroups SG by encoding M input pictures included in each subgroup multiple times in independent and different schemes. For example, as with each subgroup, each candidate encoded group may include M candidate encoded pictures. Detailed configuration of the encoding module 200 will be described with reference to FIG. 15.

In some example embodiments, each of M candidate encoded pictures included in each candidate encoded group may be an inter picture. In other words, the method and the video encoder according to some example embodiments may only be applied or employed to encode the inter pictures. An intra picture may not be encoded multiple times, but may be encoded once. Herein, the intra picture that is coded (e.g., encoded and/or decoded) without reference to other pictures may be referred to as an I picture and/or an IDR (instantaneous decoding refresh) picture, and the inter picture that is coded with reference to other pictures may be referred to as a P picture (predictive picture) and/or a B picture (bi-directional predictive picture). The P picture may be encoded with reference to a previous picture, relative to the P picture, and the B picture may be encoded with reference to both a previous picture and a next picture, relative to the B picture.

In some example embodiments, the encoding module 200 may perform an encoding operation based on a context value CTX. For example, the context value CTX may be a context that represents a current state of the video encoder 10, and/or a context for a current picture or a current subgroup that is to be encoded.

The context buffer 300 may store the context value CTX. After a single encoding operation is performed on the current picture or the current subgroup, the context value CTX may be changed or updated. Thus, if encoding operations are to be performed multiple times on the same ("common") picture or subgroup (e.g., the current picture or the current subgroup), the context value CTX should be stored into the context buffer 300 before a first encoding operation is performed. The encoding module 200 may perform the first encoding operation on the current picture or the current subgroup based on the context value CTX, and may perform a second encoding operation and encoding operations subsequent to the second encoding operation on the current picture or the current subgroup based on the context value CTX that is loaded from the context buffer 300.

The control module 400 selects one of the plurality of candidate encoded groups CG for each of the plurality of subgroups SG as M encoded pictures for the M input pictures included in each subgroup by comparing at least one coding parameter, of coding cost CS and coding quality QS, of the plurality of candidate encoded groups CG for each subgroup with each other.

The control module 400 may include a cost/quality calculator (C/Q CAL) 410, a cost/quality comparator (C/Q COMP) 420 and a cost/quality policy determinator (C/Q POL) 430.

The cost/quality calculator 410 may generate the coding cost CS and the coding quality QS of the plurality of candidate encoded groups CG. For example, the cost/quality calculator 410 may calculate coding cost and coding quality for each candidate encoded group.

In some example embodiments, the coding cost may represent the number ("quantity") of bits of M candidate encoded pictures included in each candidate encoded group. The coding quality may represent at least one of a peak signal-to-noise ratio (PSNR) and a structural similarity index (SSIM) associated with M candidate encoded pictures included in each candidate encoded group. In some example embodiments, the coding cost and the coding quality may include at least one of various criteria for determining optimized encoded pictures.

The cost/quality policy determinator 430 may set a cost/quality policy that is used for comparing the coding cost CS and the coding quality QS of the plurality of candidate encoded groups CG with each other, and may generate a policy signal PS corresponding to the cost/quality policy.

In some example embodiments, the cost/quality policy may be fixed. For example, the cost/quality policy may be determined in manufacturing of the video encoder 10, and may be stored in the video encoder 10. In some example embodiments, the cost/quality policy may be variable. For example, the cost/quality policy may be changed based on a control by a user (e.g., based on a user setting signal) or based on a current picture (e.g., based on a result of analyzing the current picture).

The cost/quality comparator 420 may generate selection signals SEL by comparing the coding cost CS of the plurality of candidate encoded groups CG with each other, by comparing the coding quality QS of the plurality of candidate encoded groups CG with each other, or by comparing both the coding cost CS and the coding quality QS of the plurality of candidate encoded groups CG with each other, based on the cost/quality policy (e.g., based on the policy signal PS). The selection signals SEL may be used for selecting one of the plurality of candidate encoded groups CG for each of the plurality of subgroup SG as M encoded pictures for M input pictures included in each subgroup.

In some example embodiments, the cost/quality comparator 420 may select a candidate encoded group that includes a candidate encoded picture having the smallest number of bits as an encoded subgroup. In some example embodiments, the cost/quality comparator 420 may select a candidate encoded group that has the highest PSNR or the largest SSIM as an encoded subgroup. In still other example embodiments, the cost/quality comparator 420 may synthetically evaluate the number of bits, the PSNR, the SSIM, etc. for each candidate encoded group to give a score for each candidate encoded group, and may select a candidate encoded group that has the highest score as an encoded subgroup.

The buffer pool 500 may include a plurality of buffers (BUF1, ..., BUFI) 510a, ..., 510i that store the plurality of candidate encoded groups CG. The buffer pool 500 may select one of the plurality of candidate encoded groups CG for each subgroup based on the selection signals SEL, and may output selected encoded groups SELG.

The output buffer 600 may receive outputs from the buffer pool 500, and may output a plurality of encoded pictures ENP corresponding to the plurality of input pictures INP. For example, as will be described with reference to FIG. 7, the output buffer 600 may output all of encoded pictures included in a selected encoded group for each subgroup. For another example, as will be described with reference to FIGS. 10A, 10B and 10C, the output buffer 600 may output all or some of encoded pictures included in a selected encoded group for each subgroup, based on a picture type of a first encoded picture in the selected encoded group.

In some example embodiments, as will be described with reference to FIG. 4, an encoding operation of the encoding module 200, a storing operation of the buffer pool 500, an overall operation (e.g., calculation, comparison and selection) of the control module 400, and an outputting operation of the output buffer 600 may be performed in units of subgroups.

Figure 3:
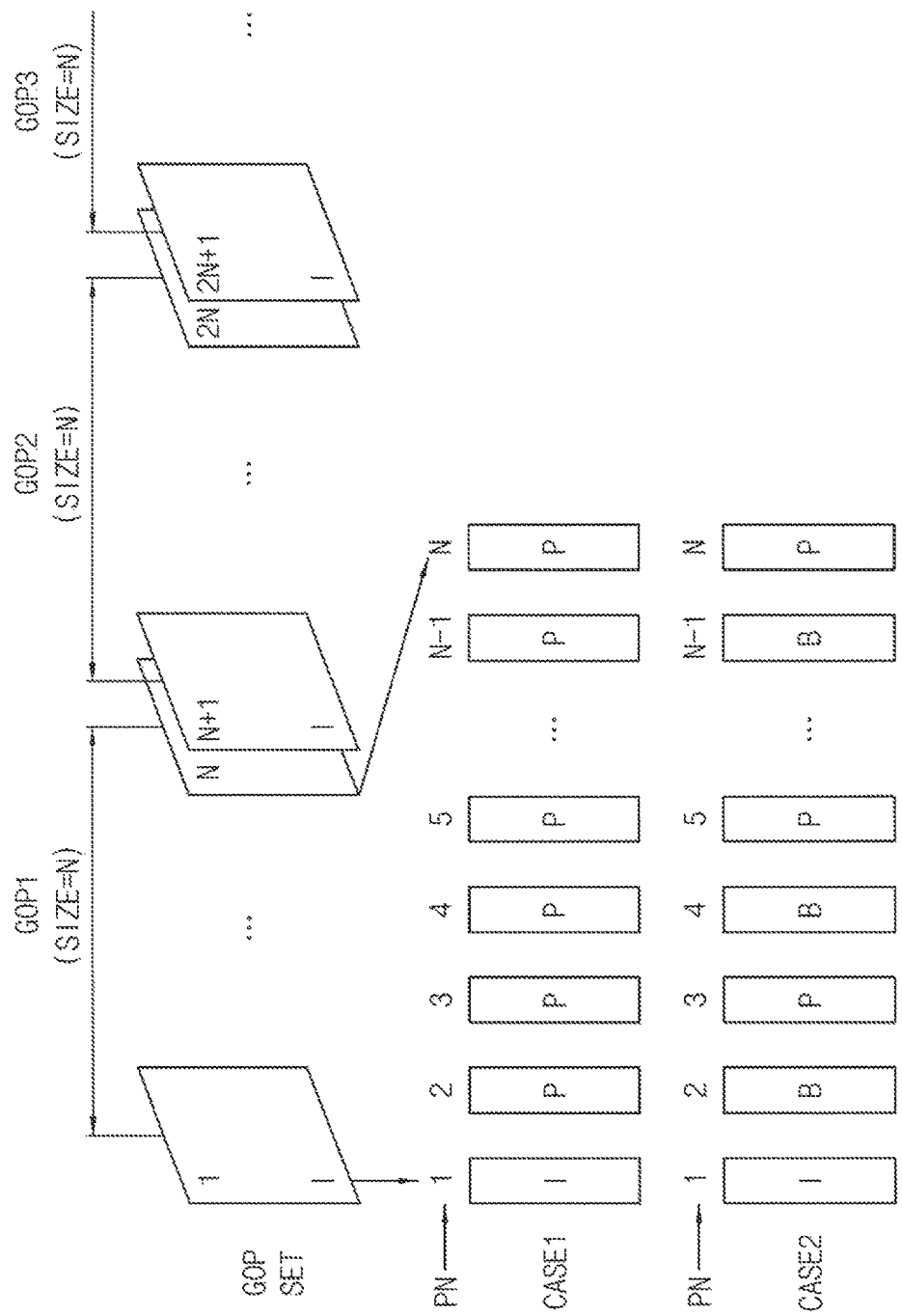
FIG. 3 is a diagram illustrating an example of a GOP having a regular structure according to some example embodiments.

FIG. 3 is a diagram illustrating an example of a GOP having a regular structure according to some example embodiments.

Referring to FIG. 3, a size of a GOP may be determined by the interval of the assigned I pictures, and a structure of the GOP may be determined by the arrangement of the assigned P and/or B pictures. The number of bits of the encoded data may be reduced by proper arrangement of the P and/or B pictures, that is, the inter pictures that are encoded with reference to other pictures. The error propagation through the successive inter pictures may be limited and/or prevented by limiting the size of the GOP, that is, by regularly or irregularly assigning the I pictures that are encoded without reference to other pictures, such that the GOP includes an irregular arrangement of inter pictures.

FIG. 3 illustrates an example of GOP setting with a normal size N by regularly assigning the I pictures. In other words, the size of the GOP may be fixed. A first picture assigned as the I picture to an N-th picture may form a first GOP GOP1, and an (N+1)-th picture assigned as the next I picture to a 2N-th picture may form a second GOP GOP2. In the same way, N pictures from a (2N+1)-th picture form a third GOP GOP3.

In a first example CASE1 in FIG. 3, only P pictures may be repeated in a single GOP. In a second example CASE2 in FIGS. 3, B and P pictures may be alternately repeated in a single GOP. As will be described with reference to FIG. 8, when a single GOP is set regularly such as the examples CASE1 and CASE2 (e.g., when a single GOP has a regular structure), coding efficiency may be degraded.

Although not illustrated in FIG. 3, a single GOP having a regular structure may be variously determined. For example, two B pictures and one P picture may be alternately repeated in a single GOP (e.g., "B-B-P" structure), or one B picture and two P pictures may be alternately repeated in a single GOP (e.g., "B-P-P" or "P-B-P" structure). For another example, B and P pictures may be repeated with one of various patterns in a single GOP.

In addition, a picture number PN in FIG. 3 may represent a display order, and the display order may be substantially the same as (e.g., the same within manufacturing tolerances and/or material tolerances) or different from a coding order depending on the structure of the GOP. For example, in the first example CASE1, the display order may be substantially the same (e.g., the same within manufacturing tolerances and/or material tolerances) as the coding order. In the second example CASE2, the display order may be different from the coding order. In the second example CASE2, a third picture (e.g., the P picture) has to be encoded before a second picture (e.g., the B picture), and then the second picture may be encoded with reference to the encoded third picture.

Hereinafter, example embodiments will be described based on an example where encoding operations are performed on a single GOP.

Figure 4:
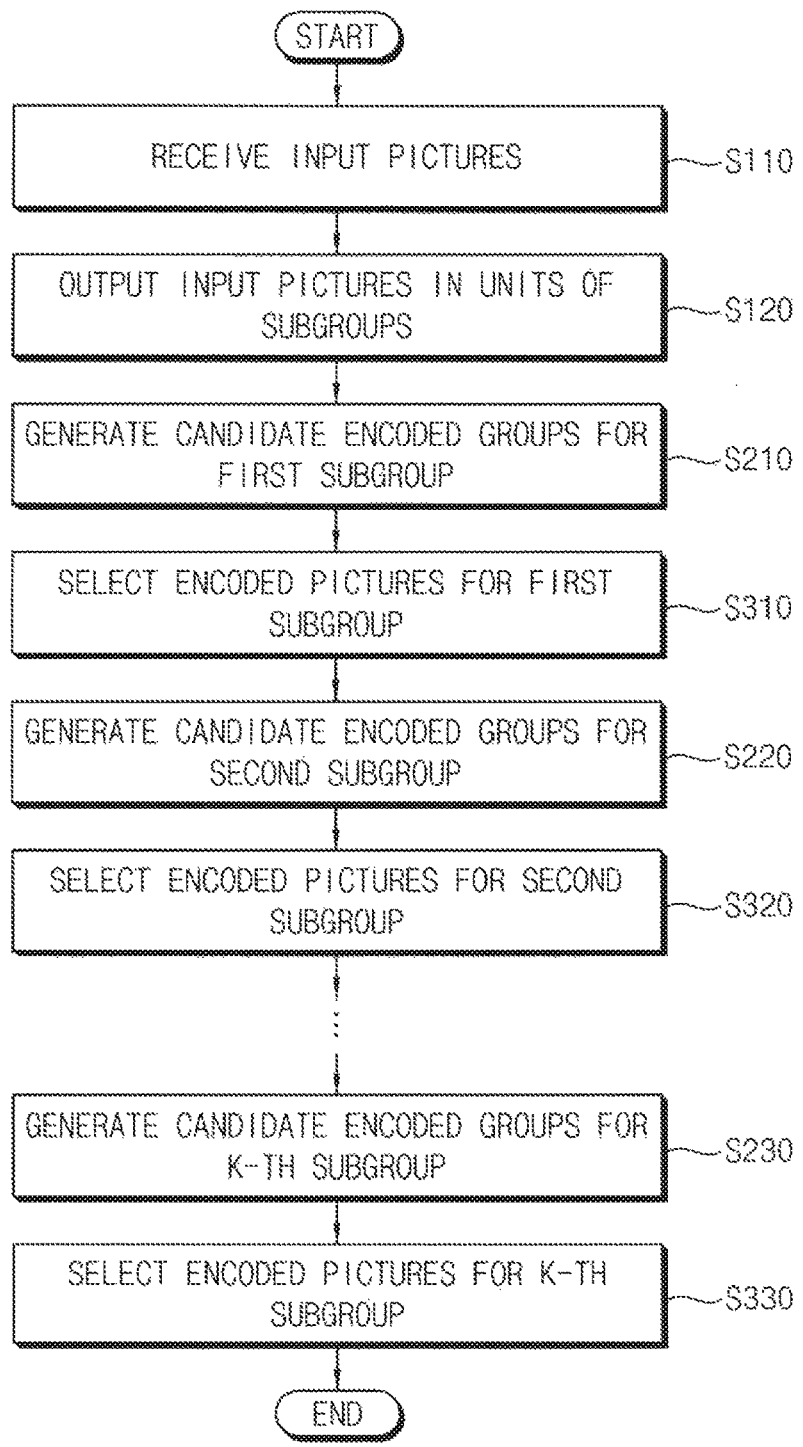
FIG. 4 is a flow chart illustrating a method of encoding video data according to some example embodiments.
Figure 5:
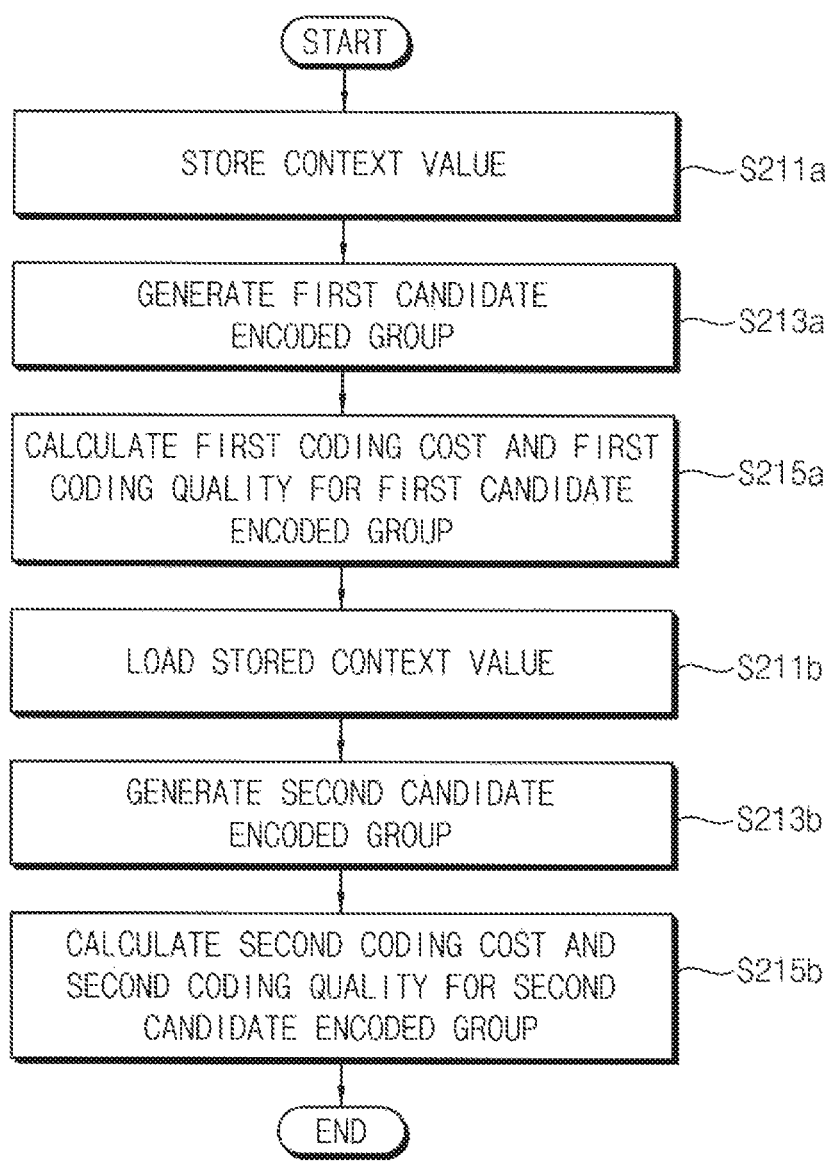
FIG. 5 is a flow chart illustrating an example of generating candidate encoded groups for a first subgroup in FIG. 4.
Figure 6:
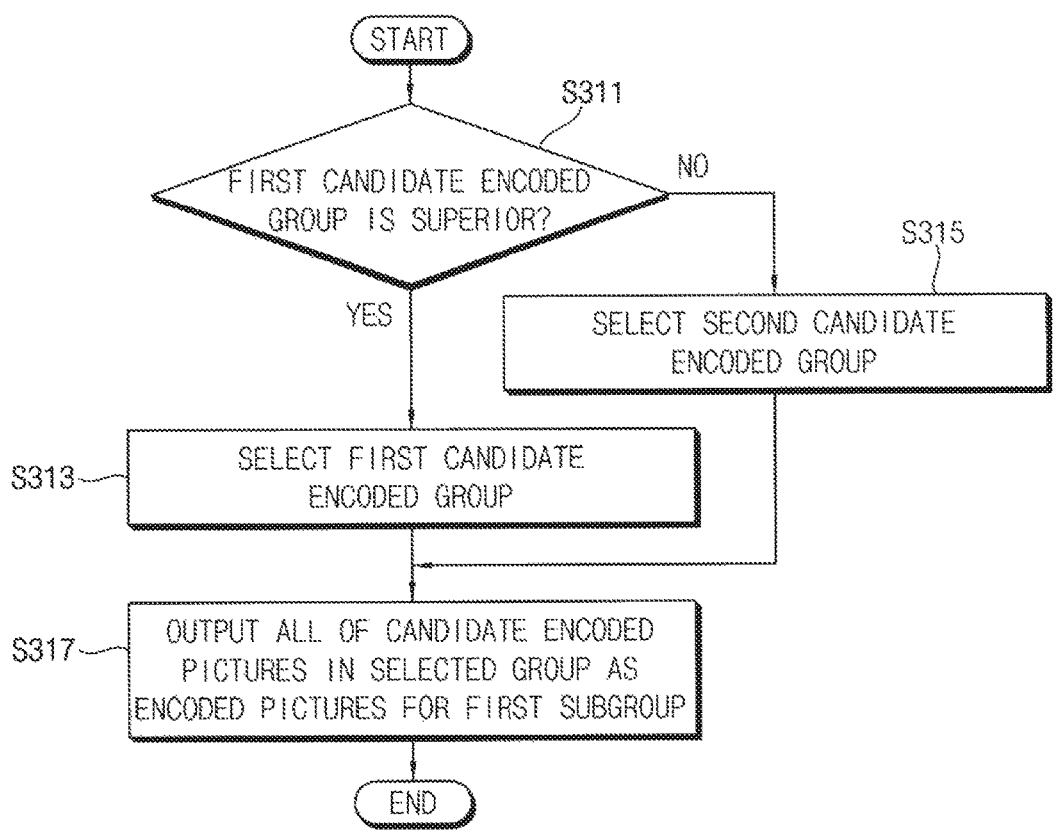
FIG. 6 is a flow chart illustrating an example of selecting encoded pictures for a first subgroup in FIG. 4.
Figure 7:
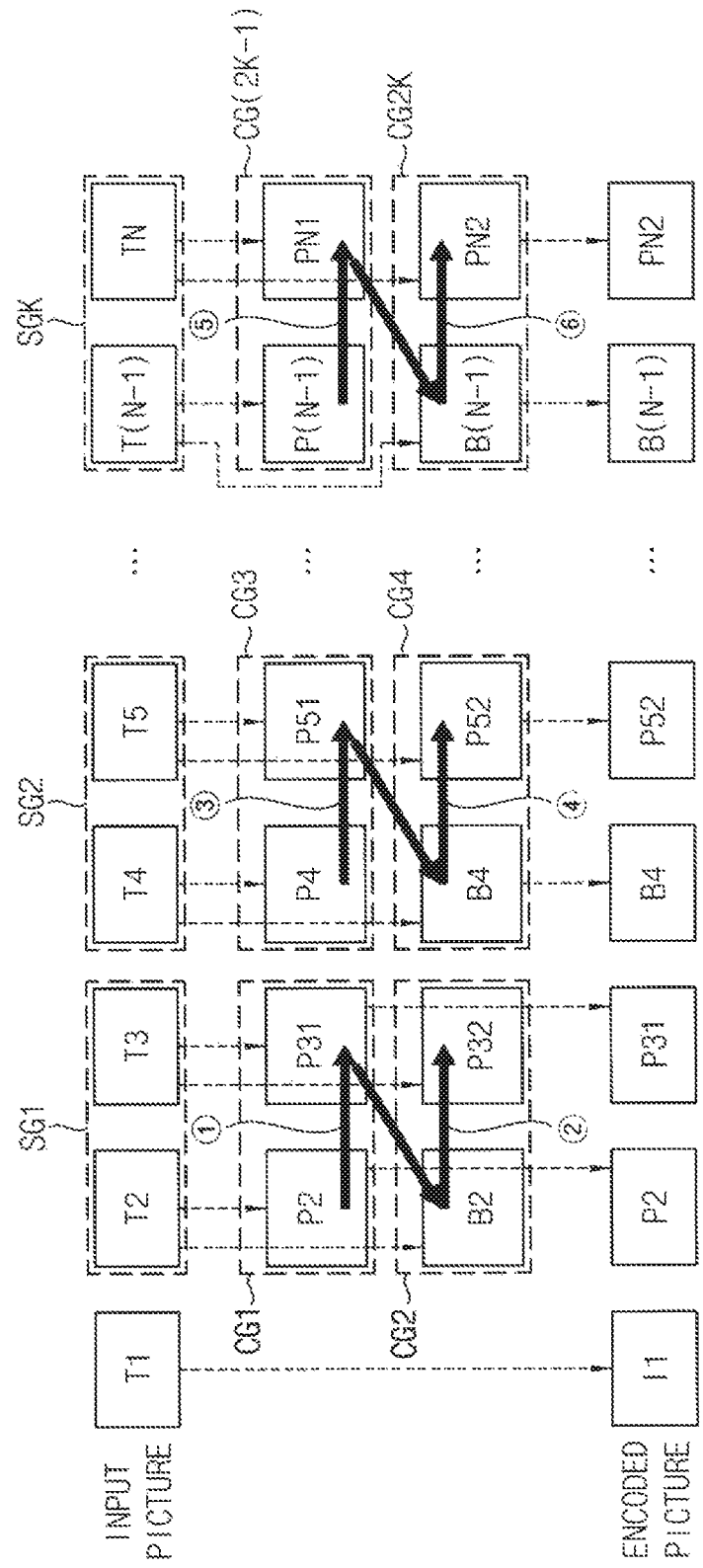
FIG. 7 is a diagram for describing the method of encoding the video data of FIG. 4.

FIG. 4 is a flow chart illustrating a method of encoding video data according to some example embodiments. FIG. 5 is a flow chart illustrating an example of generating candidate encoded groups for a first subgroup in FIG. 4. FIG. 6 is a flow chart illustrating an example of selecting encoded pictures for a first subgroup in FIG. 4. FIG. 7 is a diagram for describing the method of encoding the video data of FIG. 4. One or more of the operations illustrated in FIGS. 4-7 may be implemented, in whole or in part, by one or more video encoders, electronic systems, and/or electronic devices as described herein, including the electronic system and/or electronic device illustrated and described with reference to FIG. 18.

Referring to FIGS. 2, 4 and 7, in a method of encoding video data according to some example embodiments, a plurality of input pictures INP may be received (step S110), and the a plurality of input pictures INP may be output in units of subgroups SG (step S120). For example, the plurality of input pictures INP may include N input pictures T1, T2, T3, T4, T5, . . . , T(N−1) and TN that are included in a single GOP, where N is a natural number.

Steps S110 and S120 may be included in step S100 in FIG. 1, and may be performed by the input buffer 100. From a different viewpoint, step S120 may be described as an operation of loading the plurality of input pictures INP in units of subgroups SG.

Although not illustrated in FIG. 4, a step of outputting the input picture T1 that is arranged at the very front of the GOP and is assigned as the intra picture, and a step of generating an encoded picture I1 by encoding the input picture T1 may be further included between step S110 and step S120.

After step S120, encoded pictures may be sequentially generated in units of subgroups by encoding the input pictures T2~TN that are assigned as the inter pictures.

For example, candidate encoded groups CG1 and CG2 for a first subgroup SG1 may be independently generated (step S210). The candidate encoded groups CG1 and CG2 may have different picture orders or different picture type arrangements. In addition, optimized encoded pictures P2 and P31 for the first subgroup SG1 may be selected based on the candidate encoded groups CG1 and CG2 (step S310). In an example of FIG. 7, each subgroup may include two input pictures, and then the number of possible picture orders (e.g., the number of types of possible candidate encoded groups) may be two.

Referring to FIGS. 2, 4, 5 and 7, in step S210, a context value CTX representing a current state may be stored into the context buffer 300 (step S211a) before a first encoding operation (e.g., an arrow ① in FIG. 7) is performed on the input pictures T2 and T3 that are included in the first subgroup SG1.

The first candidate encoded group CG1 may be generated by performing the first encoding operation on the input pictures T2 and T3 included in the first subgroup SG1 based on the context value CTX (step S213a). The first candidate encoded group CG1 may include first and second candidate encoded pictures P2 and P31, and may have a first picture order. The first candidate encoded picture P2 may be generated by encoding the input picture T2, and the second candidate encoded picture P31 may be generated by encoding the input picture T3. The first and second candidate encoded pictures P2 and P31 may have the same picture type (a "common picture type"). For example, the first and second candidate encoded pictures P2 and P31 may be the inter pictures, and each of the first and second candidate encoded pictures P2 and P31 may be the P picture. In other words, the first picture order may correspond to a "P-P" structure.

A first coding cost and a first coding quality for the first candidate encoded group CG1 may be calculated (step S215a). For example, the first coding cost may represent the number of bits included in the first and second candidate encoded pictures P2 and P31. The first coding quality may represent at least one parameter of a PSNR and a SSIM associated with the first and second candidate encoded pictures P2 and P31.

After steps S213a and S215a, the context value CTX may be loaded from the context buffer 300 (step S211b) before a second encoding operation (e.g., an arrow ② in FIG. 7) is performed on the input pictures T2 and T3 that are included in the first subgroup SG1.

The second candidate encoded group CG2 may be generated by performing the second encoding operation on the input pictures T2 and T3 included in the first subgroup SG1 based on the context value CTX that is loaded from the context buffer 300 (step S213b). The first and second encoding operations may be independently performed, and thus the second encoding operation may be performed without information of the first encoding operation (e.g., statistical information associated with the first encoding operation). The second candidate encoded group CG2 may include third and fourth candidate encoded pictures B2 and P32, and may have a second picture order different from the first picture order. The third candidate encoded picture B2 may be generated by encoding the input picture T2, and the fourth candidate encoded picture P32 may be generated by encoding the input picture T3. The third and fourth candidate encoded pictures B2 and P32 may have (e.g., may be associated with) different picture types. For example, the third and fourth candidate encoded pictures B2 and P32 may be the inter pictures, the third candidate encoded picture B2 may be the B picture, and the fourth candidate encoded picture P32 may be the P picture. In other words, the second picture order may correspond to a "B-P" structure.

A second coding cost and a second coding quality for the second candidate encoded group CG2 may be calculated (step S215b).

Steps S211a and S211b may be performed by the encoding module 200 and the context buffer 300, steps S213a and S213b may be performed by the encoding module 200, and steps S215a and S215b may be performed by the cost/quality calculator 410.

Referring to FIGS. 2, 4, 6 and 7, in step S310, it may be determined which one of the first and second candidate encoded groups CG1 and CG2 is superior by comparing at least one of the first coding cost and the first coding quality for the first candidate encoded group CG1 with at least one of the second coding cost and the second coding quality for the second candidate encoded group CG2 (step S311). For example, the superior or best candidate encoded group may be determined based on at least one of various criterions described with reference to FIG. 2. For example, it may be determined that an encoded picture having lower cost (e.g., the small number of bits) and higher quality (e.g., high PSNR or high SSIM) is superior.

When it is determined that the first candidate encoded group CG1 is superior to or better than the second candidate encoded group CG2 (step S311: YES), the first and second candidate encoded pictures P2 and P31 included in the first candidate encoded group CG1 may be selected as encoded pictures for the input pictures T2 and T3 included in the first subgroup SG1 (step S313). When it is determined that the second candidate encoded group CG2 is superior to or better than the first candidate encoded group CG1 (step S311: NO), the third and fourth candidate encoded pictures B2 and P32 included in the second candidate encoded group CG2 may be selected as encoded pictures for the input pictures T2 and T3 included in the first subgroup SG1 (step S315). FIG. 7 illustrates an example where the first and second candidate encoded pictures P2 and P31 are selected as the encoded pictures for the input pictures T2 and T3.

Although not illustrated in FIG. 6, a candidate encoded group (e.g., the second candidate encoded group CG2 in FIG. 7) that is not selected in step S313 or step S315 may be deleted from the buffer pool 500.

All of the candidate encoded pictures P2 and P31 included in the selected candidate encoded group CG1 may be output ("selected") as the encoded pictures for the first subgroup SG1 (step S317). In other words, the encoded pictures P2 and P31 may be output ("selected") as a result of an optimized encoding operation for the first subgroup SG1.

Steps S311, S313 and S315 may be performed by the cost/quality comparator 420, and step S317 may be performed by the buffer pool 500 and the output buffer 600.

Referring to FIGS. 2, 4 and 7 again, as with steps S210 and S310, candidate encoded groups CG3 and CG4 for a second subgroup SG2 subsequent to the first subgroup SG1 may be independently generated (step S220), and optimized encoded pictures B4 and P52 for the second subgroup SG2 may be selected based on the candidate encoded groups CG3 and CG4 (step S320). In the same way, candidate encoded groups CG(2K−1) and CG2K for a K-th subgroup SGK may be independently generated (step S230), and optimized encoded pictures B(N−1) and PN2 for the K-th subgroup SGK may be selected based on the candidate encoded groups CG(2K−1) and CG2K (step S330), where K is a natural number less than N.

Steps S220 and S230 may be substantially the same (e.g., the same within manufacturing tolerances and/or material tolerances) as step S210, respectively, and steps S320 and S330 may be substantially the same (e.g., the same within manufacturing tolerances and/or material tolerances) as step S310, respectively.

For example, in step S220, the context value CTX may be stored into the context buffer 300. The third candidate encoded group CG3 may be generated by performing a third encoding operation (e.g., an arrow ③ in FIG. 7) on the input pictures T4 and T5 included in the second subgroup SG2 based on the context value CTX. The third candidate encoded group CG3 may include fifth and sixth candidate encoded pictures P4 and P51 and may have the first picture order. A third coding cost and a third coding quality for the third candidate encoded group CG3 may be calculated. The context value CTX may be loaded from the context buffer 300. The fourth candidate encoded group CG4 may be generated by performing a fourth encoding operation (e.g., an arrow ④ in FIG. 7) on the input pictures T4 and T5 based on the loaded context value CTX without information of the third encoding operation. The fourth candidate encoded group CG4 may include seventh and eighth candidate encoded pictures B4 and P52, and may have the second picture order. A fourth coding cost and a fourth coding quality for the fourth candidate encoded group CG4 may be calculated.

In step S320, it may be determined which one of the third and fourth candidate encoded groups CG3 and CG4 is superior by comparing at least one of the third coding cost and the third coding quality for the third candidate encoded group CG3 with at least one of the fourth coding cost and the fourth coding quality for the fourth candidate encoded group CG4, and then the superior or best candidate encoded group may be selected. The seventh and eighth candidate encoded pictures B4 and P52 included in the fourth candidate encoded group CG4 may be selected as encoded pictures for the input pictures T4 and T5 included in the second subgroup SG2, and all of the candidate encoded pictures B4 and P52 included in the selected candidate encoded group CG4 may be output as the encoded pictures for the second subgroup SG2.

In step S230, the context value CTX may be stored into the context buffer 300. The candidate encoded group CG(2K−1) may be generated by performing an encoding operation (e.g., an arrow ⑤ in FIG. 7) on the input pictures T(N−1) and TN included in the K-th subgroup SGK based on the context value CTX. The candidate encoded group CG(2K−1) may include candidate encoded pictures P(N−1) and PN1 and may have the first picture order. A coding cost and a coding quality for the candidate encoded group CG(2K−1) may be calculated. The context value CTX may be loaded from the context buffer 300. The candidate encoded group CG2K may be generated by performing an encoding operation (e.g., an arrow ⑥ in FIG. 7) on the input pictures T(N−1) and TN based on the loaded context value CTX without information of the encoding operation ⑤. The candidate encoded group CG2K may include candidate encoded pictures B (N−1) and PN2, and may have the second picture order. A coding cost and a coding quality for the candidate encoded group CG2K may be calculated.

In step S330, it may be determined which one of the candidate encoded groups CG(2K−1) and CG2K is superior by comparing at least one of the coding cost and the coding quality for the candidate encoded group CG(2K−1) with at least one of the coding cost and the coding quality for the candidate encoded group CG2K, and then the superior or best candidate encoded group may be selected. The candidate encoded pictures B(N−1) and PN2 included in the candidate encoded group CG2K may be selected as encoded pictures for the input pictures T(N−1) and TN included in the K-th subgroup SGK, and all of the candidate encoded pictures B(N−1) and PN2 included in the selected candidate encoded group CG2K may be output as the encoded pictures for the K-th subgroup SGK.

In some example embodiments, as illustrated in FIG. 7, if a single GOP includes N input pictures and K subgroups, and if a single subgroup includes two input pictures (e.g., M=2), N may be substantially equal (e.g., the same within manufacturing tolerances and/or material tolerances) to 2*K+1 (e.g., N=2*K+1).

In an example of FIG. 7, the encoding operations ①, ③ and ⑤ that correspond to the first picture order may be referred to as a first encoding path, and the encoding operations ②, ④ and ⑥ that correspond to the second picture order may be referred to as a second encoding path. In the method and the video encoder according to some example embodiments, the encoding operations on the first encoding path and the encoding operations on the second encoding path may not be alternately performed in units of GOPs, but may be alternately performed in units of subgroups. In other words, in the method and the video encoder according to some example embodiments, a coding order may not be an order of ①, ③, ⑤, ②, ④ and ⑥, but may be an order of ①, ②, ③, ④, ⑤ and ⑥. Accordingly, the optimized encoded pictures I1, P2, P31, B4, P52, . . . , B(N−1) and PN2 may be sequentially provided or output in units of subgroups, coding efficiency and performance may be improved, and a coding process and response may be efficiently adopted to a real time case.

Different from the examples CASE1 and CASE2 in FIG. 3, the GOP that is encoded according to some example embodiments may have an irregular structure. In other words, the encoded pictured P2~PN2 (e.g., the inter pictures) may be irregularly arranged in a single GOP that is encoded according to some example embodiments. However, although the GOP has an irregular structure, the size of the GOP may be fixed.

Although FIG. 7 illustrates a single GOP that is encoded according to some example embodiments, each of a plurality of GOPs may be encoded according to some example embodiments as with an example of FIG. 7, and thus the plurality of GOPs may have different structures. In addition, arrangements of the candidate encoded pictures and the encoded pictured I1~PN2 may represent a display order, and the display order may be substantially the same as (e.g., the same within manufacturing tolerances and/or material tolerances) or different from a coding order depending on the structure of the candidate encoded groups, as described with reference to FIG. 3.

Figure 8:
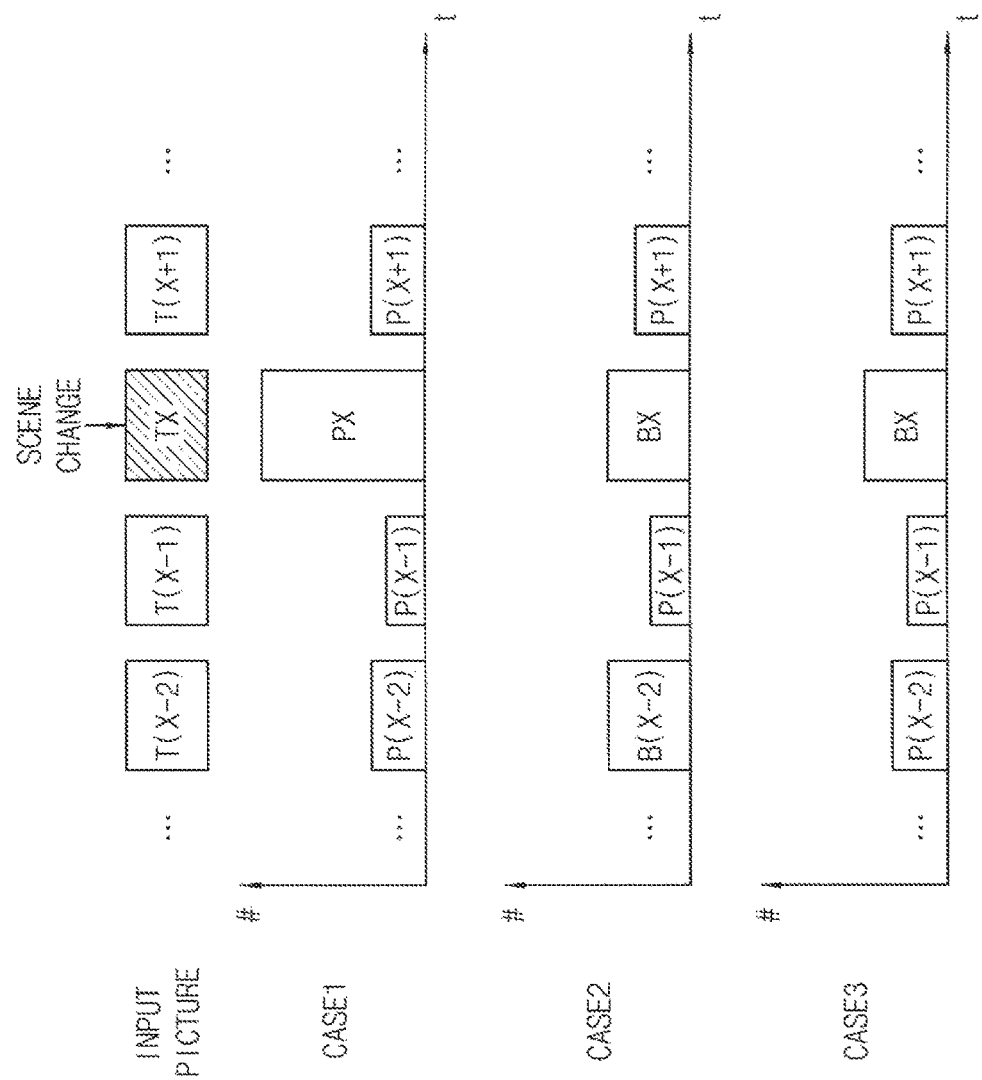
FIG. 8 is a diagram for describing a method of encoding video data according to some example embodiments.

FIG. 8 is a diagram for describing a method of encoding video data according to some example embodiments. One or more of the operations illustrated in FIG. 8 may be implemented, in whole or in part, by one or more video encoders, electronic systems, and/or electronic devices as described herein, including the electronic system and/or electronic device illustrated and described with reference to FIG. 18. In FIG. 8, CASE1 and CASE2 correspond to CASE1 and CASE2 in FIG. 3, respectively, and CASE3 may represent encoded pictures that are generated according to some example embodiments. In FIG. 8, a horizontal axis and a vertical axis represent a lapse of time t and the number of bits #, respectively.

Referring to FIG. 8, input pictures T(X−2), T(X−1), TX and T(X+1) may be sequentially provided, and a scene change may occur in an X-th input picture TX, where X is a natural number.

In the first example CASE1 where all of the input pictures are encoded to P pictures P(X−2), P(X−1), PX and P(X+1), the number of bits included in the X-th encoded picture PX for the X-th input picture TX may be sharply or drastically increased. In the second example CASE2 where the input pictures are alternately encoded to P pictures P(X−1) and P(X+1) and B pictures B(X−2) and BX, the number of bits included in the X-th encoded picture BX for the X-th input picture TX may be smaller than the number of bits included in the X-th encoded picture PX in the first example CASE1, however, the number of bits included in another encoded picture (e.g., the (X−2)-th encoded picture B(X−2)) may be greater than the number of bits included in a corresponding encoded picture (e.g., the (X−2)-th encoded picture P(X−2)) in the first example CASE1.

In the third example CASE3 where the input pictures are encoded to have an irregular structure according to some example embodiments, optimized picture types for current pictures may be adaptively selected in real time, and thus optimized encoded pictures P(X−2), P(X−1), BX and P(X+1) may be efficiently generated.

Figure 9:
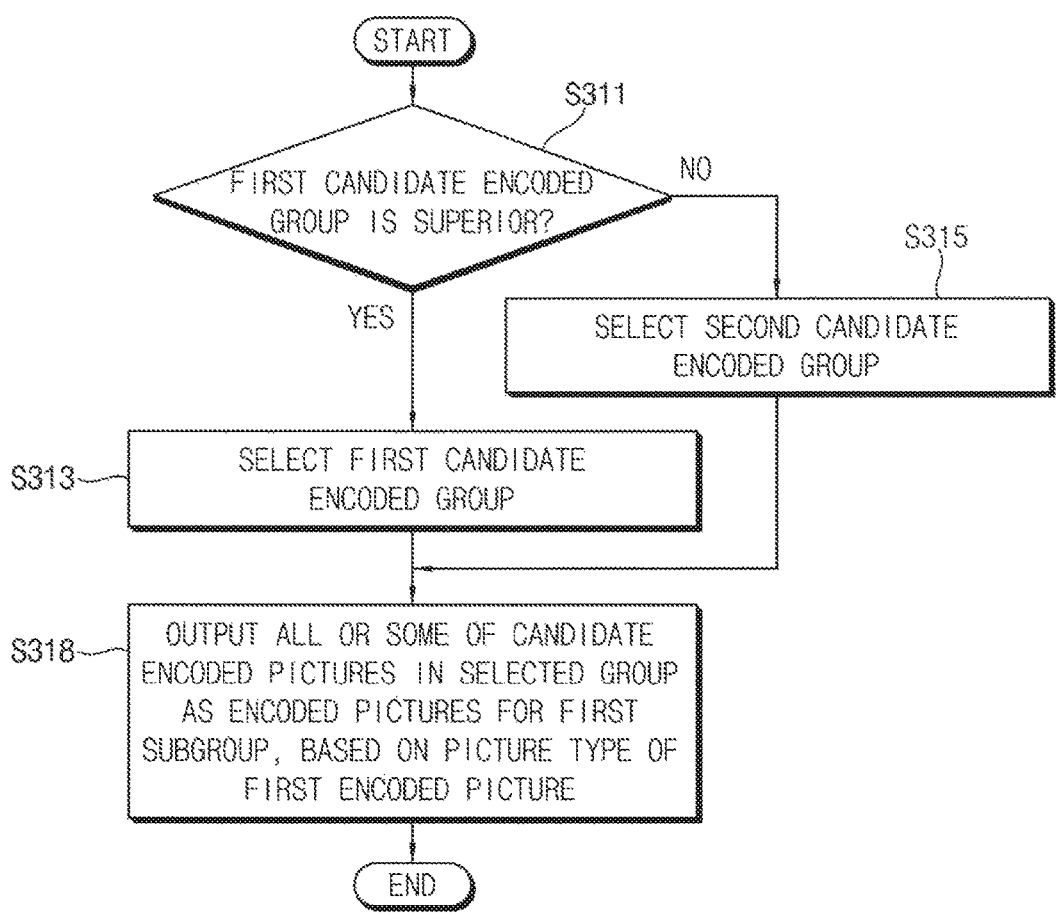
FIG. 9 is a flow chart illustrating another example of selecting encoded pictures for a first subgroup in FIG. 4.
Figure 10A:
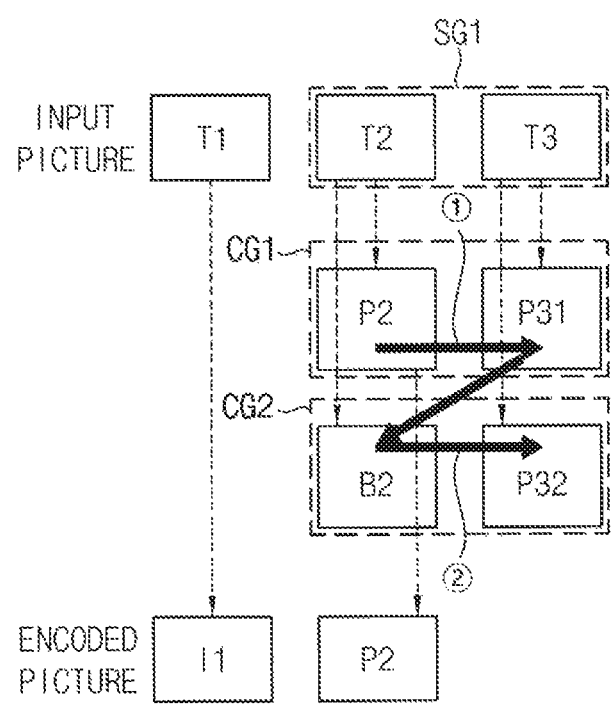
FIGS. 10A, 10B and 10C are diagrams for describing the method of encoding the video data of FIG. 4.
Figure 10B:
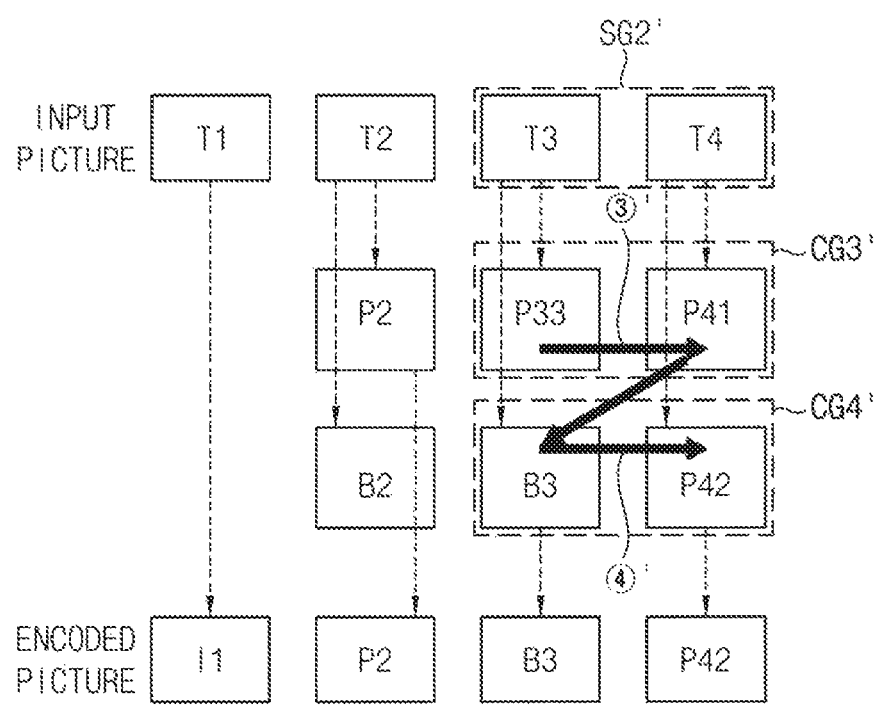
Figure 10C:
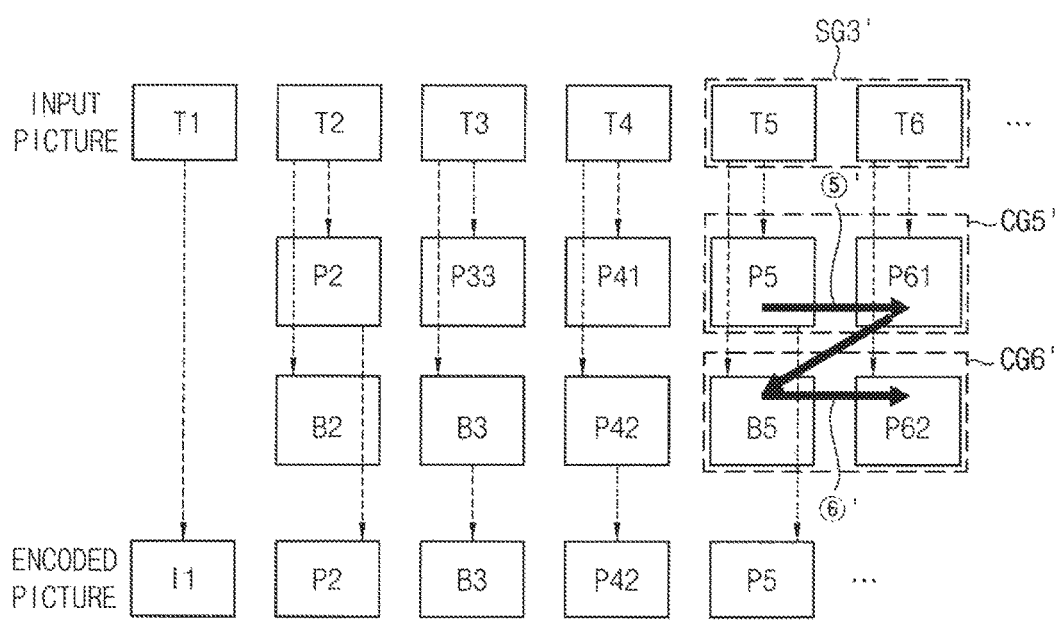

FIG. 9 is a flow chart illustrating another example of selecting encoded pictures for a first subgroup in FIG. 4. FIGS. 10A, 10B and 10C are diagrams for describing the method of encoding the video data of FIG. 4. One or more of the operations illustrated in FIGS. 9-10C may be implemented, in whole or in part, by one or more video encoders, electronic systems, and/or electronic devices as described herein, including the electronic system and/or electronic device illustrated and described with reference to FIG. 18.

Referring to FIGS. 2, 4, 9 and 10A, steps S110, S120 and S210 may be substantially the same (e.g., the same within manufacturing tolerances and/or material tolerances) as steps S110, S120 and S210 that are described with reference to FIGS. 4 and 5.

In step S310, steps S311, S313 and S315 in FIG. 9 may be substantially the same (e.g., the same within manufacturing tolerances and/or material tolerances) as steps S311, S313 and S315 in FIG. 6, respectively.

All or some of the candidate encoded pictures P2 and P31 included in the selected candidate encoded group CG1 may be output as the encoded pictures for the first subgroup SG1, based on a picture type of the encoded picture P2 that is arranged at the very front of the selected candidate encoded group CG1 (step S318). For example, as illustrated in FIG. 10A, when the encoded picture P2 arranged at the very front of the selected candidate encoded group CG1 is the P picture, only the encoded picture P2 may be output as the encoded picture for the first subgroup SG1. For another example, as will be described with reference to FIG. 10B, when an encoded picture B3 arranged at the very front of a selected candidate encoded group CG4' is the B picture, all of the encoded pictures B3 and P42 may be output as encoded pictures for a second subgroup SG2'.

As with step S317 in FIG. 6, step S318 may be performed by the buffer pool 500 and the output buffer 600.

Referring to FIGS. 2, 4 and 10B, as with steps S210 and S310, candidate encoded groups CG3' and CG4' for the second subgroup SG2' subsequent to the first subgroup SG1 may be independently generated (step S220), and optimized encoded pictures B3 and P42 for the second subgroup SG2' may be selected based on the candidate encoded groups CG3' and CG4' (step S320). Depending on a result of encoding a previous subgroup (e.g., the first subgroup SG1), at least one input picture (e.g., the input picture T3) may be commonly included in two adjacent subgroups (e.g., the first and second subgroups SG1 and SG2').

For example, when only the encoded picture P2 for the input picture T2 is output as a result of encoding the first subgroup SG1, the second subgroup SG2' may be set to include two input pictures T3 and T4 subsequent to the input picture T2. In other words, a size of the second subgroup SG2' in FIG. 10B may be substantially the same (e.g., the same within manufacturing tolerances and/or material tolerances) as a size of the second subgroup SG2 in FIG. 7, and a starting point of the second subgroup SG2' in FIG. 10B may be different from a starting point of the second subgroup SG2 in FIG. 7.

The candidate encoded groups CG3' and CG4' may be generated by sequentially and independently performing encoding operations (e.g., arrows ③' and ④' in FIG. 10B) on the input pictures T3 and T4 included in the second subgroup SG2'. The candidate encoded group CG3' may include candidate encoded pictures P33 and P41 and may have the first picture order. The candidate encoded group CG4' may include candidate encoded pictures B3 and P42 and may have the second picture order. For example, the candidate encoded picture P33 in FIG. 10B may be substantially the same (e.g., the same within manufacturing tolerances and/or material tolerances) as the candidate encoded picture P31 in FIG. 10A, and then a generation of the candidate encoded picture P33 may be omitted.

The superior or best candidate encoded group (e.g., the candidate encoded group CG4') may be selected by calculating and comparing coding cost and coding quality for the candidate encoded groups CG3' and CG4'. Since the encoded picture B3 arranged at the very front of the selected candidate encoded group CG4' is the B picture, all of the encoded pictures B3 and P42 may be output as the encoded pictures for the second subgroup SG2'.

Referring to FIG. 10C, as with steps S210 and S310, candidate encoded groups CG5' and CG6' for a third subgroup SG3' subsequent to the second subgroup SG2' may be independently generated, and optimized encoded pictures P5 and P61 for the third subgroup SG3' may be selected based on the candidate encoded groups CG5' and CG6'.

When all of the encoded pictures B3 and P42 for the input pictures T3 and T4 are output as a result of encoding the second subgroup SG2', the third subgroup SG3' may be set to include two input pictures T5 and T6 subsequent to the input picture T4. An input picture that is commonly included in the second and third subgroups SG2' and SG3' may not exist.

The candidate encoded groups CG5' and CG6' may be generated by sequentially and independently performing encoding operations (e.g., arrows ⑤' and ⑥' in FIG. 10C) on the input pictures T5 and T6 included in the third subgroup SG3'. The candidate encoded group CG5' may include candidate encoded pictures P5 and P61 and may have the first picture order. The candidate encoded group CG6' may include candidate encoded pictures B5 and P62 and may have the second picture order.

The superior or best candidate encoded group (e.g., the candidate encoded group CG5') may be selected by calculating and comparing coding cost and coding quality for the candidate encoded groups CG5' and CG6'. Since the encoded picture P5 arranged at the very front of the selected candidate encoded group CG5' is the P picture, only the encoded picture P5 may be output as the encoded picture for the third subgroup SG3'.

Different from an example of FIG. 7, a starting point of each subgroup may also be adaptively changed in an example of FIGS. 10A, 10B and 10C, and thus coding efficiency and performance may be improved. In comparison with an example of FIG. 7, the number of subgroups included in a single GOP may be increased in an example of FIGS. 10A, 10B and 10C.

Figure 11:
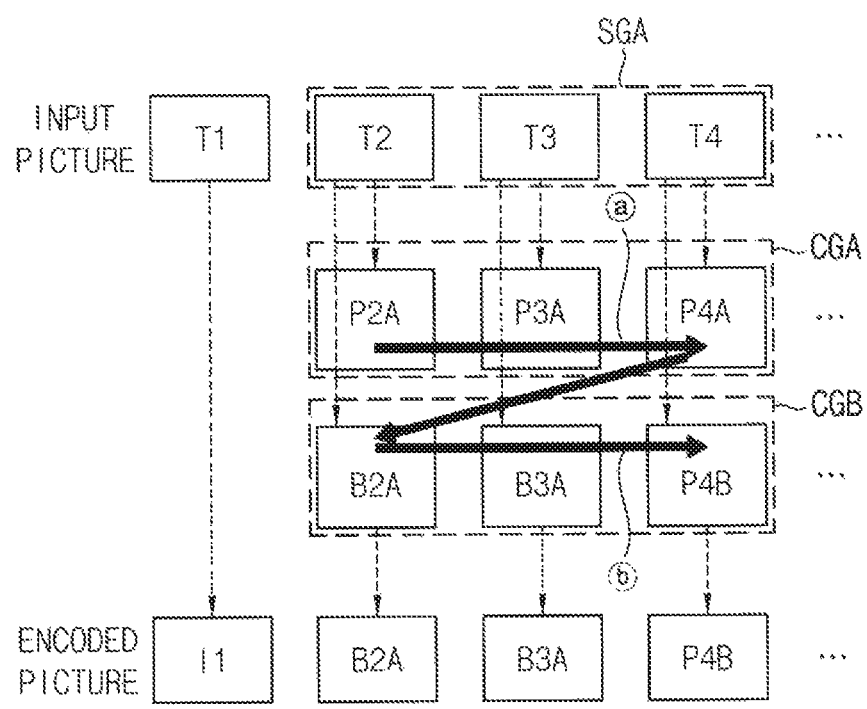
FIG. 11 is a diagram for describing the method of encoding the video data of FIG. 4.

FIG. 11 is a diagram for describing the method of encoding the video data of FIG. 4. One or more of the operations illustrated in FIG. 11 may be implemented, in whole or in part, by one or more video encoders, electronic systems, and/or electronic devices as described herein, including the electronic system and/or electronic device illustrated and described with reference to FIG. 18.

An example of FIG. 11 may be similar to an example of FIG. 7, except than a single subgroup includes three input pictures in an example of FIG. 11.

Referring to FIGS. 2, 4, 5 and 11, steps S110 and S120 may be substantially the same (e.g., the same within manufacturing tolerances and/or material tolerances) as steps S110 and S120 that are described with reference to FIG. 4.

In step S210, candidate encoded groups CGA and CGB may be generated by sequentially and independently performing encoding operations (e.g., arrows ⓐ and ⓑ in FIG. 11) on input pictures T2, T3 and T4 included in a first subgroup SGA (steps S211a, S213a, S211b and S213b). The candidate encoded group CGA may include candidate encoded pictures P2A, P3A and P4A and may have a picture order of "P-P-P". The candidate encoded group CGB may include candidate encoded pictures B2A, B3A and P4B and may have a picture order of "B-B-P". Coding cost and coding quality for the candidate encoded groups CGA and CGB may be calculated (steps S215a and S215b).

In step S310, the superior or best candidate encoded group (e.g., the candidate encoded group CGB) may be selected by comparing the coding cost and the coding quality for the candidate encoded groups CGA and CGB.

In some example embodiments, all of the candidate encoded pictures B2A, B3A and P4B included in the selected candidate encoded group CGB may be output as encoded pictures for the first subgroup SGA. In some example embodiments, all or some of the candidate encoded pictures B2A, B3A and P4B included in the selected candidate encoded group CGB may be output as the encoded pictures for the first subgroup SGA, based on a picture type of the encoded picture B2A that is arranged at the very front of the selected candidate encoded group CGB.

In some example embodiments, an encoding operation for each subgroup subsequent to the first subgroup SGA may be performed based on an example of FIG. 7. In some example embodiments, an encoding operation for each subgroup subsequent to the first subgroup SGA may be performed based on an example of FIGS. 10A, 10B and 10C.

Figure 12:
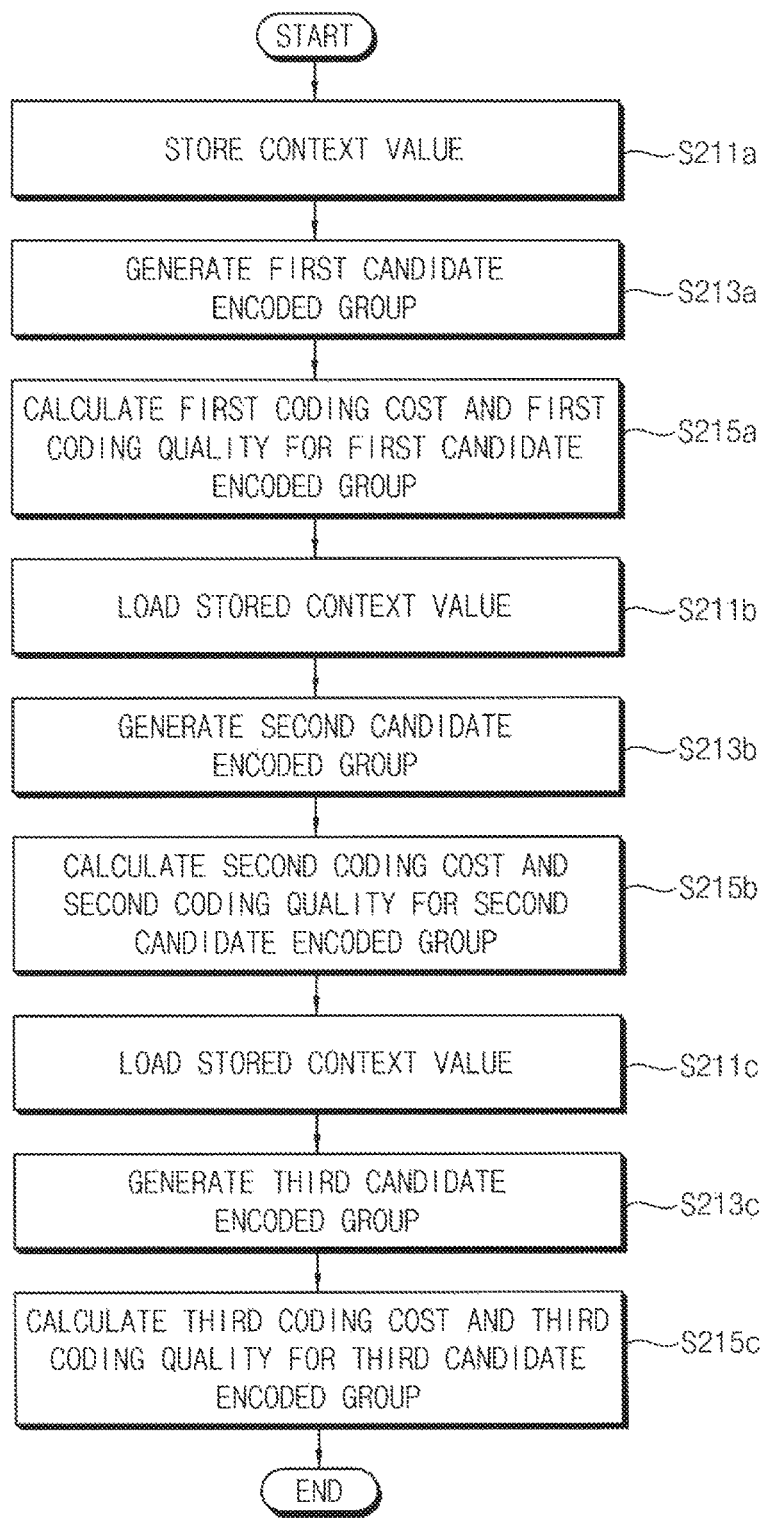
FIG. 12 is a flow chart illustrating another example of generating candidate encoded groups for a first subgroup in FIG. 4.
Figure 13:
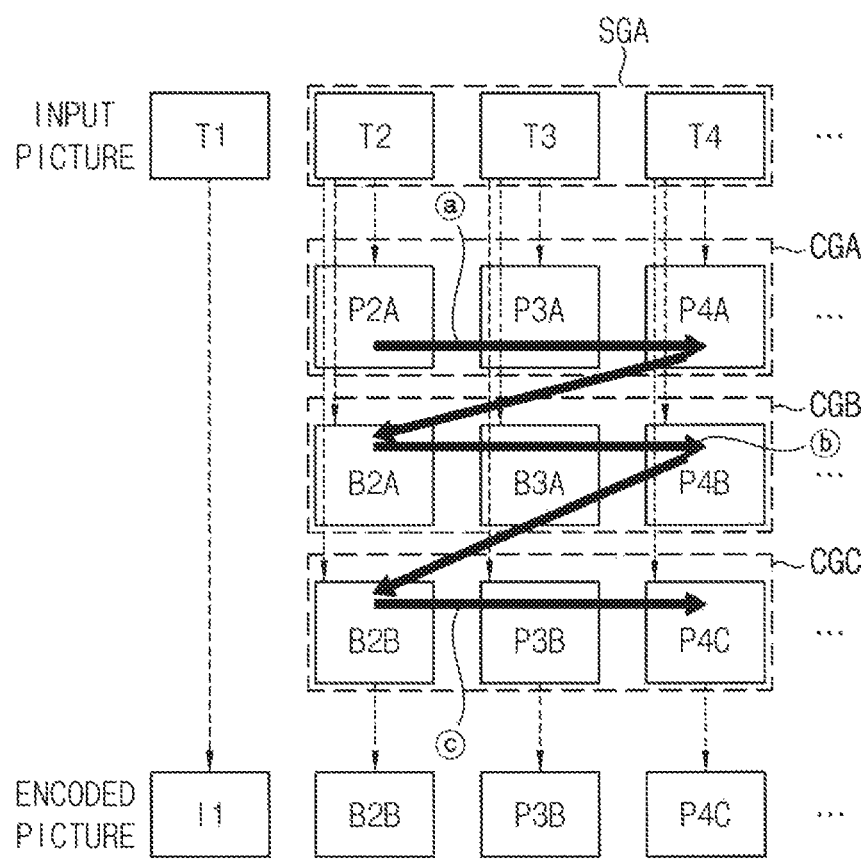
FIGS. 13 and 14 are diagrams for describing the method of encoding the video data of FIG. 4.
Figure 14:
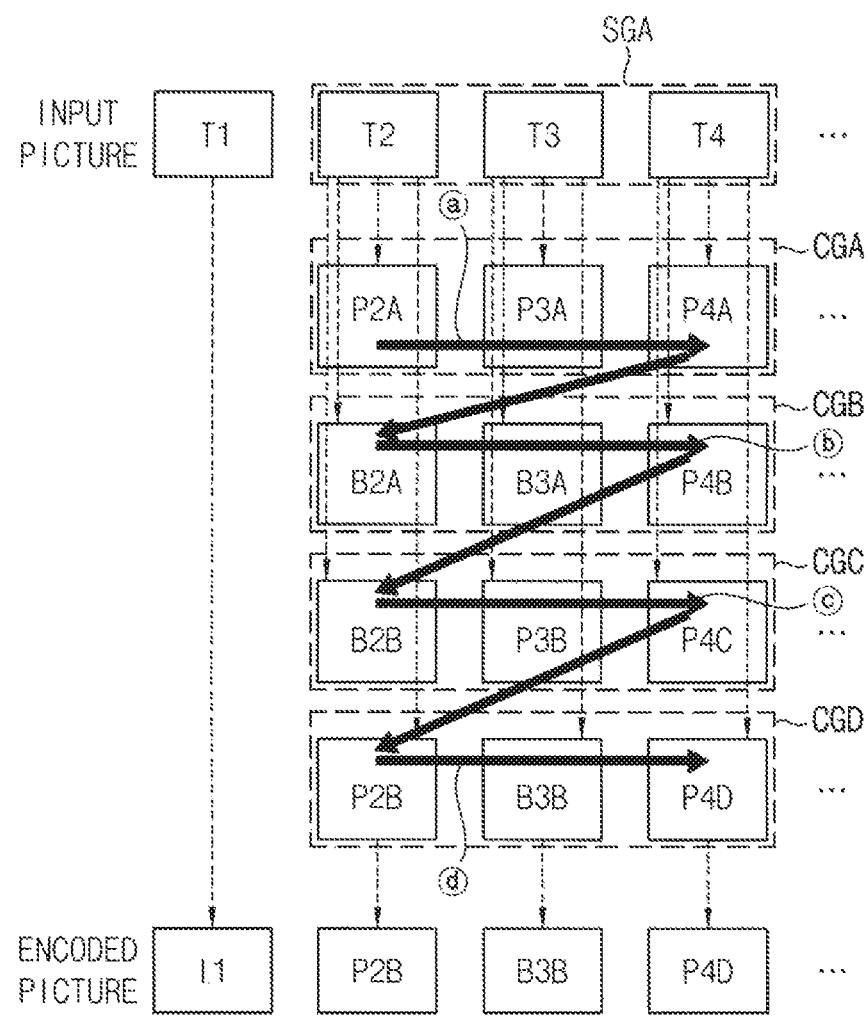

FIG. 12 is a flow chart illustrating another example of generating candidate encoded groups for a first subgroup in FIG. 4. FIGS. 13 and 14 are diagrams for describing the method of encoding the video data of FIG. 4. One or more of the operations illustrated in FIGS. 12-14 may be implemented, in whole or in part, by one or more video encoders, electronic systems, and/or electronic devices as described herein, including the electronic system and/or electronic device illustrated and described with reference to FIG. 18.

Referring to FIGS. 2, 4, 12 and 13, steps S110 and S120 may be substantially the same (e.g., the same within manufacturing tolerances and/or material tolerances) as steps S110 and S120 that are described with reference to FIG. 4, and steps S211a, S213a, S215a, S211b, S213b and S215b may be substantially the same (e.g., the same within manufacturing tolerances and/or material tolerances) as steps S211a, S213a, S215a, S211b, S213b and S215b that are described with reference to FIGS. 5 and 11.

After step S215b, the context value CTX may be loaded from the context buffer 300 again (step S211c). A candidate encoded group CGC may be generated by additionally performing an encoding operation (e.g., an arrow ⓒ in FIG. 13) on the input pictures T2, T3 and T4 included in the first subgroup SGA based on the loaded context value CTX (step S213c). The encoding operation ⓒ may be performed without information of the encoding operations ⓐ and ⓑ. The candidate encoded group CGC may include candidate encoded pictures B2B, P3B and P4C and may have a picture order of "B-P-P" different from that of the candidate encoded groups CGA and CGB. A coding cost and a coding quality for the candidate encoded group CGC may be calculated (step S215c).

In step S310, the superior or best candidate encoded group (e.g., the candidate encoded group CGC) may be selected by comparing the coding cost and the coding quality for the candidate encoded groups CGA, CGB and CGC.

In comparison with an example of FIG. 11, a third encoding path including the encoding operation ⓒ may be further included in an example of FIG. 13. In the method and the video encoder according to some example embodiments, the encoding operations on the first, second and third encoding paths may be alternately performed in units of subgroups, and thus optimized encoded pictures may be sequentially provided or output in units of subgroups.

Referring to FIGS. 2, 4 and 14, steps S110 and S120 may be substantially the same (e.g., the same within manufacturing tolerances and/or material tolerances) as steps S110 and S120 that are described with reference to FIG. 4, and steps S211a, S213a, S215a, S211b, S213b, S215b, S211c, S213c and S215c may be substantially the same (e.g., the same within manufacturing tolerances and/or material tolerances) as steps S211a, S213a, S215a, S211b, S213b, S215b, S211c, S213c and S215c that are described with reference to FIGS. 12 and 13.

After step S215c, the context value CTX may be loaded from the context buffer 300 again. A candidate encoded group CGD may be generated by additionally performing an encoding operation (e.g., an arrow ⓓ in FIG. 14) on the input pictures T2, T3 and T4 included in the first subgroup SGA based on the loaded context value CTX. The encoding operation ⓓ may be performed without information of the encoding operations ⓐ, ⓑ and e. The candidate encoded group CGD may include candidate encoded pictures P2B, B3B and P4D and may have a picture order of "P-B-P" different from that of the candidate encoded groups CGA, CGB and CGC. A coding cost and a coding quality for the candidate encoded group CGD may be calculated.

In step S310, the superior or best candidate encoded group (e.g., the candidate encoded group CGD) may be selected by comparing the coding cost and the coding quality for the candidate encoded groups CGA, CGB, CGC and CGD.

In comparison with an example of FIG. 13, a fourth encoding path including the encoding operation ⓓ may be further included in an example of FIG. 14. In the method and the video encoder according to some example embodiments, the encoding operations on the first, second, third and fourth encoding paths may be alternately performed in units of subgroups, and thus optimized encoded pictures may be sequentially provided or output in units of subgroups.

In examples of FIGS. 13 and 14, an encoding operation for each subgroup subsequent to the first subgroup SGA may be performed based on an example of FIG. 7 or based on an example of FIGS. 10A, 10B and 10C.

In examples of FIGS. 11, 13 and 14, each subgroup may include three input pictures, and then the number of possible picture orders (e.g., the number of types of possible candidate encoded groups) may be more than three. The number of input pictures included in a single subgroup and/or the number of possible picture orders for a single subgroup may be vary according to some example embodiments.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 15:
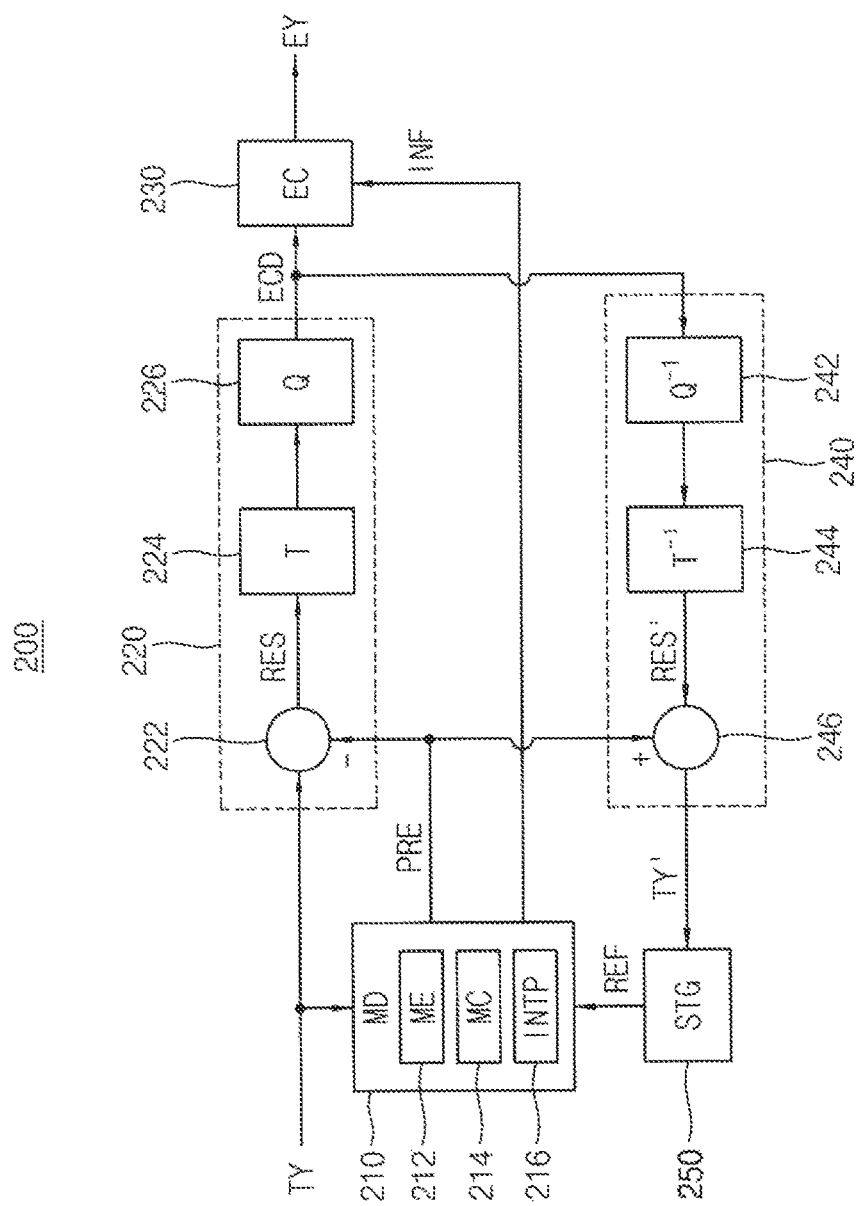
FIG. 15 is a block diagram illustrating an example of an encoding module included in a video encoder according to some example embodiments.

FIG. 15 is a block diagram illustrating an example of an encoding module included in a video encoder according to some example embodiments. The encoding module illustrated in FIG. 15 may be implemented, in whole or in part, by one or more electronic systems and/or electronic devices as described herein, including the electronic system and/or electronic device illustrated and described with reference to FIG. 18. For example, the encoding module shown in FIG. 15 may be implemented, in whole or in part, by the processor 1030 of the electronic system 1000 of FIG. 18 executing a program of instructions stored on a storage device 1050 (e.g., a memory) of the electronic system 1000.

Referring to FIG. 15, an encoding module 200 may include a mode decision block (MD) 210, a compression block 220, an entropy encoder (EC) 230, a reconstruction block 240 and a storage block (STG) 250.

The mode decision block 210 may generate a predicted picture PRE based on a current picture TY and a reference picture REF, and may generate coding information INF that includes a prediction mode depending on a prediction operation, a result of the prediction operation, syntax elements, context values, etc. The mode decision block 210 may include a motion estimation unit (ME) 212, a motion compensation unit (MC) 214 and an intra prediction unit (INTP) 216. The motion estimation unit 212 may generate or obtain a motion vector. The motion compensation unit 214 may perform a compensation operation based on the motion vector. The intra prediction unit 216 may perform an intra prediction. The motion estimation unit 212 and the motion compensation unit 214 may be referred to as an inter prediction unit that performs an inter prediction.

The compression block 220 may encode the current picture TY to generate an encoded data ECD. The compression block 220 may include a subtractor 222, a transform unit (T) 224 and a quantization unit (Q) 226. The subtractor 222 may subtract the predicted picture PRE from the current picture TY to generate a residual picture RES. The transform unit 224 and the quantization unit 226 may transform and quantize the residual picture RES to generate the encoded data ECD.

The reconstruction block 240 may be used to generate a reconstructed picture TY' by reversely decoding the encoded data ECD (e.g., loss-encoded data). The reconstruction block 240 may include an inverse quantization unit (Q−1) 242, an inverse transform unit (T−1) 244 and an adder 246. The inverse quantization unit 242 and the inverse transform unit 244 may inverse-quantize and inverse-transform the encoded data ECD to generate a residual picture RES'. The adder 246 may add the residual picture RES' to the predicted picture PRE to generate the reconstructed picture TY'.

The entropy encoder 230 may perform a lossless encoding with respect to the encoded data ECD and the coding information INF to generate an encoded picture EY. The reconstructed picture TY' may be stored into the storage 250, and may be used as another reference picture for encoding the other pictures.

Figure 16:
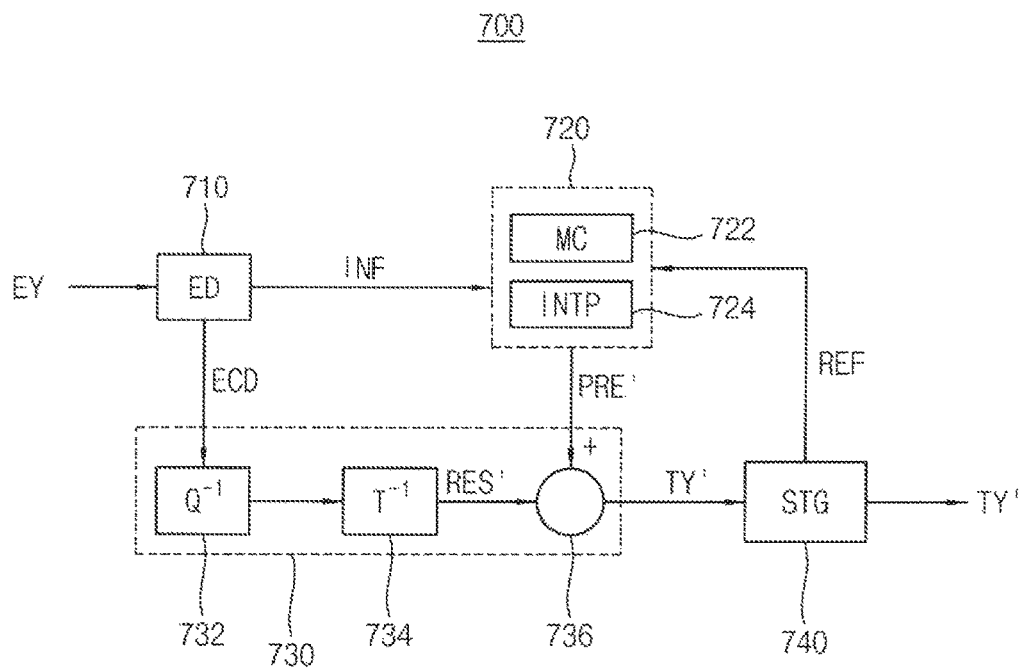
FIG. 16 is a block diagram illustrating a video decoder according to some example embodiments.

FIG. 16 is a block diagram illustrating a video decoder according to some example embodiments. The video decoder illustrated in FIG. 16 may be implemented, in whole or in part, by one or more electronic systems and/or electronic devices as described herein, including the electronic system and/or electronic device illustrated and described with reference to FIG. 18. For example, the video decoder shown in FIG. 16 may be implemented, in whole or in part, by the processor 1030 of the electronic system 1000 of FIG. 18 executing a program of instructions stored on a storage device 1050 (e.g., a memory) of the electronic system 1000.

Referring to FIG. 16, a video decoder 700 may include an entropy decoder (ED) 710, a prediction block 720, a reconstruction block 730 and a storage 740. The video decoder 700 may generate a reconstructed picture or a decoded picture by reversely decoding a picture that is encoded by an encoding module (e.g., the encoding module 200 of FIG. 15) included in a video encoder.

The entropy decoder 710 may decode the encoded picture EY (e.g., may perform a lossless decoding with respect to the encoded picture EY) to generate the encoded data ECD and the coding information INF.

The prediction block 720 may generate a predicted picture PRE' based on the reference picture REF and the coding information INF. The prediction block 720 may include a motion compensation unit 722 and an intra prediction unit 724 that are substantially the same (e.g., the same within manufacturing tolerances and/or material tolerances) as the motion compensation unit 214 and an intra prediction unit 216 in FIG. 15, respectively.

The reconstruction block 730 may include an inverse quantization unit 732, an inverse transform unit 734 and an adder 736. The reconstruction block 730, the inverse quantization unit 732, the inverse transform unit 734, the adder 736 and the storage 740 may be substantially the same (e.g., the same within manufacturing tolerances and/or material tolerances) as the reconstruction block 240, the inverse quantization unit 242, the inverse transform unit 244, the adder 246 and the storage 250 in FIG. 15, respectively. The reconstructed picture TY' may be used as another reference picture for encoding the other pictures, or may be provided to a display device (e.g., a display device 826 in FIG. 17).

In some example embodiments, a single picture may be divided into a plurality of picture blocks, and the encoding module 200 of FIG. 15 and the video decoder 700 of FIG. 16 may perform encoding and decoding operations in units of picture blocks that are included in a single picture. For example, each picture block may be referred to as a macroblock in the H.264 standard. Alternatively, each picture block may be referred to as a coding unit (CU), a prediction unit (PU) or a transform unit (TU) in the HEVC standard.

Figure 17:
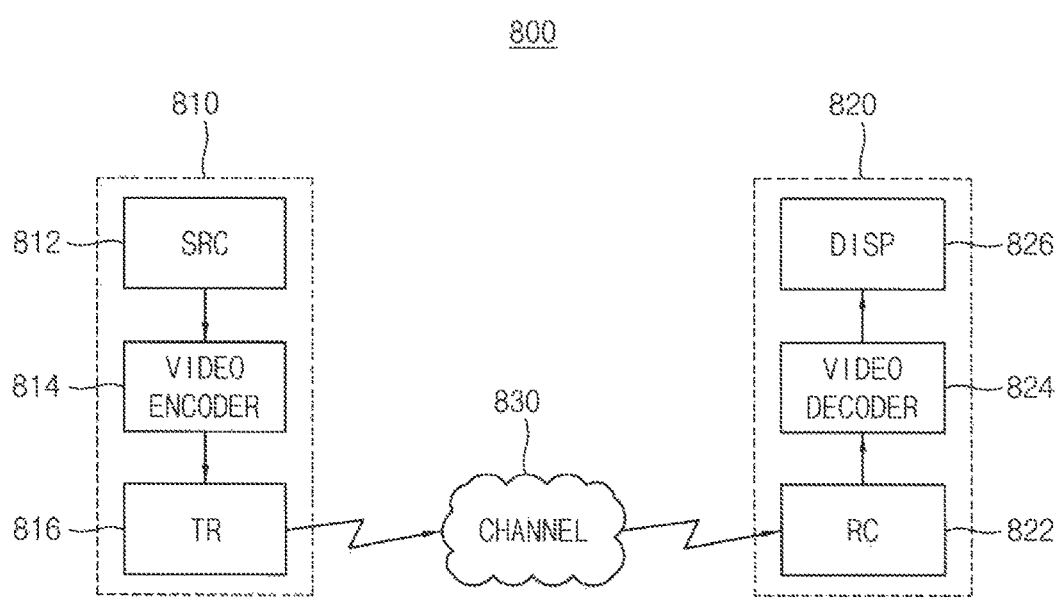
FIG. 17 is a block diagram illustrating a video encoding and decoding system according to some example embodiments.

FIG. 17 is a block diagram illustrating a video encoding and decoding system according to some example embodiments. The video encoding and decoding system illustrated in FIG. 17 may be implemented, in whole or in part, by one or more electronic systems and/or electronic devices as described herein, including the electronic system and/or electronic device illustrated and described with reference to FIG. 18. For example, the video encoding and decoding system shown in FIG. 17 may be implemented, in whole or in part, by the processor 1030 of the electronic system 1000 of FIG. 18 executing a program of instructions stored on a storage device 1050 (e.g., a memory) of the electronic system 1000.

Referring to FIG. 17, a video encoding and decoding system 800 may include a first device 810 and a second device 820. The first device 810 may communicate with the second device 820 via a channel 830. For example, the channel 830 may include a wired channel and/or a wireless channel.

The first device 810 and the second device 820 may be referred to as a source device and a destination device, respectively. Some elements of the first and second devices 810 and 820 that are irrelevant to an operation of the video encoding and decoding system 800 are omitted in FIG. 17 for convenience of illustration.

The first device 810 may include a video source (SRC) 812, a video encoder 814 and a transmitter (TR) 816. The video source 812 may provide video data. The video encoder 814 may encode the video data. The transmitter 816 may transmit the encoded video data to the second device 820 via the channel 830. The video encoder 814 may be the video encoder according to some example embodiments. The second device 820 may include a receiver (RC) 822, a video decoder 824 and a display device (DISP) 826. The receiver 822 may receive the encoded video data transmitted from the first device 810. The video decoder 824 may decode the encoded video data. The display device 826 may display a video or an image based on the decoded video data.

In some example embodiments, the video encoder according to some example embodiments may be merged with the video decoder in the same integration circuit and/or corresponding software, and then the merged device may be referred to as a video coder/decoder (codec).

Figure 18:
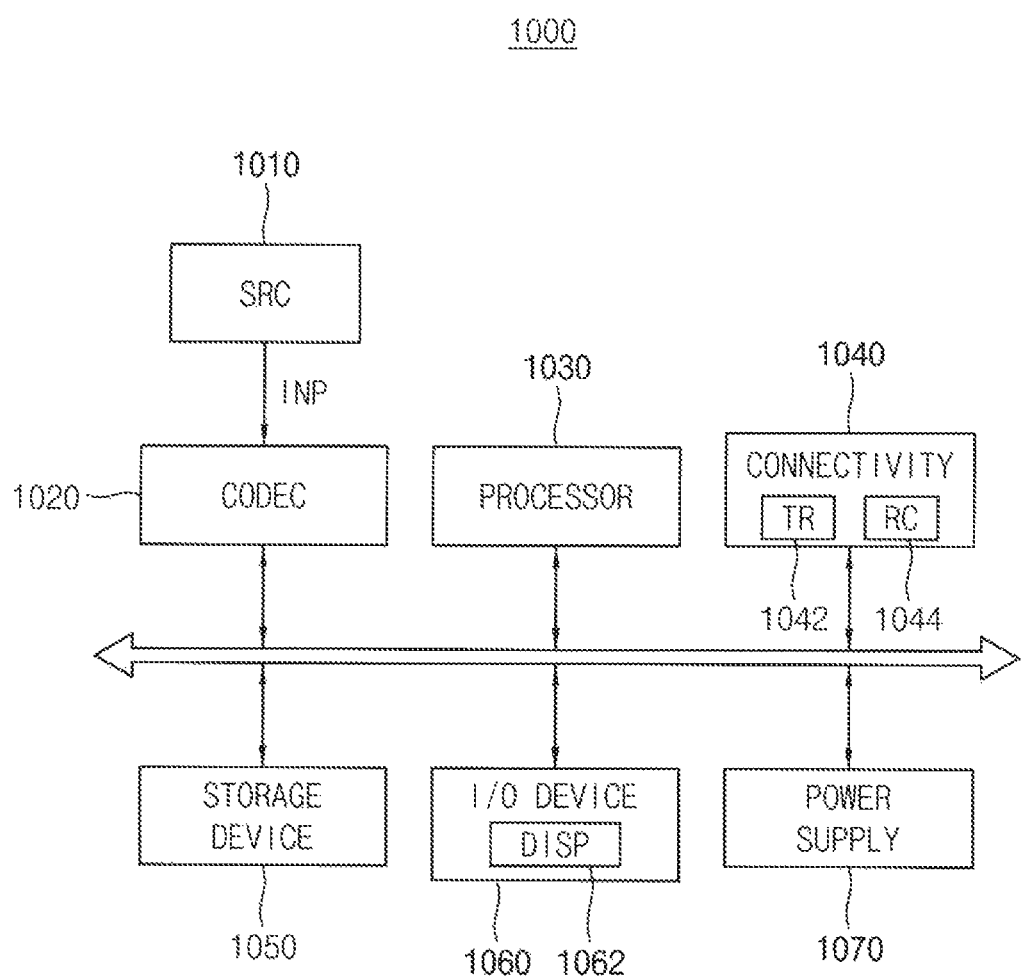
FIG. 18 is a block diagram illustrating an electronic system according to some example embodiments.

FIG. 18 is a block diagram illustrating an electronic system according to some example embodiments. In some example embodiments, the electronic system 1000 illustrated in FIG. 18 may be an electronic device.

Referring to FIG. 18, an electronic system 1000 includes a video source 1010 and a video codec 1020. The electronic system 1000 may further include a processor 1030, a connectivity module 1040, a storage device 1050, an input/output (I/O) device 1060 and a power supply 1070.

The video source 1010 provides a plurality of input pictures INP. For example, the video source 1010 may include a video pickup device, a storage, etc.

The video codec 1020 includes a video encoder according to some example embodiments and a video decoder. The video encoder may encode the plurality of input pictures INP.

The processor 1030 may perform various computational functions such as particular calculations and tasks. The connectivity module 1040 may communicate with an external device and may include a transmitter 1042 and/or a receiver 1044. The storage device 1050 may operate as a data storage for data processed by the electronic system 1000, or as a working memory. The I/O device 1060 may include at least one input device such as a keypad, a button, a microphone, a touch screen, etc., and/or at least one output device such as a speaker, a display device 1062, etc. The power supply 1070 may provide power to the electronic system 1000. The processor 1030 may execute one or more programs of instruction stored in the storage device 1050 to implement some or all of the operations and/or devices illustrated and described herein.

The present disclosure may be applied to various devices and/or systems that encode video data. Particularly, some example embodiments of the inventive concept may be applied to a video encoder that is compatible with standards such MPEG, H.261, H.262, H.263 and H.264. Some example embodiments of the inventive concept may be adopted in technical fields such as CATV (Cable TV on optical networks, copper, etc.), DBS (Direct broadcast satellite video services), DSL (Digital subscriber line video services), DTTB (Digital terrestrial television broadcasting), ISM (Interactive storage media (optical disks, etc.)), MMM (Multimedia mailing), MSPN (Multimedia services over packet networks), RTC (Real-time conversational services (videoconferencing, videophone, etc.)), RVS (Remote video surveillance), SSM (Serial storage media (digital VTR, etc.)).

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A video encoder comprising:
   a memory storing a program of instructions; and
   a processor configured to execute the program of instructions to
      receive a plurality of input pictures,
      output the plurality of input pictures as a plurality of subgroups of one or more input pictures, a size of each subgroup being smaller than a size of a group of pictures (GOP),
      generate, for each given subgroup, a plurality of candidate encoded groups associated with the given subgroup based on encoding one or more input pictures included in the given subgroup multiple times according to separate, independent encoding schemes,
      store, for each given subgroup, the plurality of candidate encoded groups associated with the given subgroup in a buffer pool,
      select, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other, and
      generate a video display based on the selecting, the video display including the pluralities of encoded pictures associated with the plurality of subgroups, respectively.

2. The video encoder of claim 1, wherein generating, for each given subgroup, the plurality of candidate encoded groups associated with the given subgroup includes
   generating a first candidate encoded group based on performing a first encoding operation on a first input picture and a second input picture included in a first subgroup, the first candidate encoded group including a first candidate encoded picture and a second candidate encoded picture, the first candidate encoded group having a first picture order, and
   generating a second candidate encoded group based on performing a second encoding operation on the first input picture and the second input picture without using information associated with the first encoding operation, the second candidate encoded group including a third candidate encoded picture and a fourth candidate encoded picture, the second candidate encoded group having a second picture order that is different from the first picture order.

3. The video encoder of claim 2, the processor further configured to execute the program of instructions to
   store a context value in a context buffer prior to performing the first encoding operation,
   perform the first encoding operation based on the context value, and
   perform the second encoding operation based on the context value.

4. The video encoder of claim 2, wherein the processor is further configured to execute the program of instructions to
   calculate a first coding cost and a first coding quality associated with the first candidate encoded group,
   calculate a second coding cost and a second coding quality associated with the second candidate encoded group,
   compare at least one first coding parameter of the first coding cost and the first coding quality with a corresponding second coding parameter of the second coding cost and the second coding quality, respectively based on a cost/quality policy, and
   select one candidate encoded group, of the first candidate encoded group and the second candidate encoded group, as first and second encoded pictures associated with the first and second input pictures based on a result of the comparing.

5. The video encoder of claim 4, the processor further configured to execute the program of instructions to
   output the first and second input pictures that are transmitted from the buffer pool based on the comparing.

6. The video encoder of claim 4, the processor further configured to execute the program of instructions to
   output both the first and second encoded pictures that are transmitted from the buffer pool or only the first encoded picture that is transmitted from the buffer pool, based on the comparing and further based on a picture type of the first encoded picture.

7. The video encoder of claim 4, wherein the cost/quality policy is variable.

8. An electronic system comprising:
   a memory storing a program of instructions; and
   a processor configured to execute the program of instructions to
      provide a plurality of input pictures, and
      encode the plurality of input pictures, the encoding including
         receiving the plurality of input pictures,
         outputting the plurality of input pictures as a plurality of subgroups of one or more input pictures, a size of each subgroup being smaller than a size of a group of pictures (GOP),
         generating, for each given subgroup, a plurality of candidate encoded groups associated with the given subgroup based on encoding one or more input pictures included in the given subgroup multiple times according to separate, independent encoding schemes,
         storing the plurality of candidate encoded groups in a plurality of buffers,
         selecting, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other, and generating a video display based on the selecting, the video display including the pluralities of encoded pictures associated with the plurality of subgroups, respectively.

9. The electronic system of claim 8, the processor further configured to execute the program of instructions to generate, for each given subgroup, the plurality of candidate encoded groups associated with the given subgroup based on generating a first candidate encoded group based on performing a first encoding operation on a first input picture and a second input picture included in a first subgroup, the first candidate encoded group including a first candidate encoded picture and a second candidate encoded picture, the first candidate encoded group having a first picture order, and generating a second candidate encoded group based on performing a second encoding operation on the first input picture and the second input picture without using information associated with the first encoding operation, the second candidate encoded group including a third candidate encoded picture and a fourth candidate encoded picture, the second candidate encoded group having a second picture order that is different from the first picture order.

10. The electronic system of claim 9, the processor further configured to execute the program of instructions to store a context value in a context buffer prior to performing the first encoding operation, perform the first encoding operation based on the context value, and perform the second encoding operation based on the context value.

11. The electronic system of claim 9, the processor further configured to execute the program of instructions to calculate a first coding cost and a first coding quality associated with the first candidate encoded group, calculate a second coding cost and a second coding quality associated with the second candidate encoded group, compare at least one first coding parameter of the first coding cost and the first coding quality with a corresponding second coding parameter of the second coding cost and the second coding quality, respectively based on a cost/quality policy, and select one candidate encoded group, of the first and second candidate encoded pictures or the third and fourth candidate encoded pictures as first and second encoded pictures associated with the first and second input pictures based on a result of the comparing.

12. The electronic system of claim 11, the processor further configured to execute the program of instructions to select the first and second input pictures that are transmitted from a buffer pool based on the comparing.

13. The electronic system of claim 11, the processor further configured to execute the program of instructions to output both the first and second encoded pictures that are transmitted from a buffer pool or only the first encoded picture that is transmitted from the buffer pool, based on the comparing and further based on a picture type of the first encoded picture.

14. An electronic device, comprising:

a memory storing a program of instructions; and a processor configured to execute the program of instructions to receive a plurality of input pictures, the plurality of input pictures including a plurality of subgroups of one or more input pictures, a size of each subgroup being smaller than a size of a group of pictures (GOP), generate, for each given subgroup, a plurality of candidate encoded groups associated with the given subgroup based on encoding one or more input pictures included in the given subgroup multiple times according to separate, independent encoding schemes, select, for each given subgroup, one candidate encoding group, of the plurality of candidate encoded groups associated with the given subgroup, as a plurality of encoded pictures associated with the given subgroup based on comparing at least one coding parameter, of coding cost and coding quality, of the plurality of candidate encoded groups associated with the given subgroup with each other, and generate a video display based on the selecting, the video display including the pluralities of encoded pictures associated with the plurality of subgroups, respectively.

15. The electronic device of claim 14, wherein the processor further configured to execute the program of instructions to generate, for each given subgroup, the plurality of candidate encoded groups associated with the given subgroup based on generating a first candidate encoded group based on performing a first encoding operation on a first input picture and a second input picture included in a first subgroup, the first candidate encoded group including a first candidate encoded picture and a second candidate encoded picture, the first candidate encoded group having a first picture order, and generating a second candidate encoded group based on performing a second encoding operation on the first input picture and the second input picture without using information associated with the first encoding operation, the second candidate encoded group including a third candidate encoded picture and a fourth candidate encoded picture, the second candidate encoded group having a second picture order that is different from the first picture order.

16. The electronic device of claim 15, the processor further configured to execute the program of instructions to store a context value in a context buffer prior to performing the first encoding operation, perform the first encoding operation based on the context value, and perform the second encoding operation based on the context value.

17. The electronic device of claim 15, the processor further configured to execute the program of instructions to calculate a first coding cost and a first coding quality associated with the first candidate encoded group, calculate a second coding cost and a second coding quality associated with the second candidate encoded group, compare at least one first coding parameter of the first coding cost and the first coding quality with a corresponding second coding parameter of the second coding cost and the second coding quality, respectively based on a cost/quality policy, and select one candidate encoded group, of the first candidate encoded group or the second candidate encoded group, as first and second encoded pictures associated with the first and second input pictures based on a result of the comparing.

18. The electronic device of claim 17, the processor further configured to execute the program of instructions to output the first and second input pictures that are transmitted from a buffer pool based on the comparing.

19. The electronic device of claim 17, the processor further configured to execute the program of instructions to output both the first and second encoded pictures that are transmitted from a buffer pool or only the first encoded picture that is transmitted from the buffer pool, based on the comparing and further based on a picture type of the first encoded picture.

20. The electronic device of claim 17, wherein the cost/quality policy is variable.

* * * * *